US008562863B2

(12) United States Patent
Chen et al.

(10) Patent No.: US 8,562,863 B2
(45) Date of Patent: Oct. 22, 2013

(54) CHOLESTERIC GLASSY LIQUID CRYSTALS WITH HYBRID CHIRAL-NEMATIC MESOGENS

(75) Inventors: Shaw H. Chen, Rochester, NY (US); Chunki Kim, Santa Barbara, CA (US)

(73) Assignee: The University of Rochester, Rochester, NY (US)

( * ) Notice: Subject to any disclaimer, the term of this patent is extended or adjusted under 35 U.S.C. 154(b) by 742 days.

(21) Appl. No.: 12/558,411

(22) Filed: Sep. 11, 2009

(65) Prior Publication Data

US 2010/0086704 A1    Apr. 8, 2010

Related U.S. Application Data

(60) Provisional application No. 61/096,044, filed on Sep. 11, 2008.

(51) Int. Cl.
*C09K 19/00* (2006.01)
*C09K 19/32* (2006.01)
*C09K 19/20* (2006.01)
*B29C 65/00* (2006.01)
*B05D 3/00* (2006.01)
*C08J 7/18* (2006.01)
*G21H 5/00* (2006.01)

(52) U.S. Cl.
USPC .............. 252/299.01; 252/299.6; 252/299.62; 252/299.67; 252/299.7; 428/1.1; 428/1.2; 427/553; 156/278

(58) Field of Classification Search
USPC .............. 252/299.01, 299.6, 299.61, 299.62, 252/299.66–67, 299.7; 428/1.1, 1.2; 430/20; 349/1, 56, 193; 156/278; 427/553
See application file for complete search history.

(56) References Cited

U.S. PATENT DOCUMENTS

| 5,378,393 | A | 1/1995 | Chen et al. | |
| 5,514,296 | A | 5/1996 | Chen et al. | |
| 6,558,572 | B2 * | 5/2003 | Chen et al. | 252/299.1 |
| 6,730,242 | B2 | 5/2004 | Chen et al. | |
| 7,001,648 | B2 | 2/2006 | Chen et al. | |

OTHER PUBLICATIONS

Attard et al.; Liquid-crystalline and glass-forming dimmers derived from 1-aminopyrene; Liquid Crystals, 1992, vol. 11, No. 5; pp. 785-789.
Attard et al.; Low Molar Mass Liquid-Crystalline Glasses: Preparation and Properties of the α-(4-Cyanobiphenyl-4'-osy)-w-(1-pyreniminebenzylidene-4'-oxy)alkanes; Chem. Mater., 1992, vol. 4; pp. 1246-1253.
Chen et al.; Circularly polarized light generated by photoexcitation of luminophores in glassy liquid-crystal films; Nature, Feb. 11, 1999, vol. 397; pp. 506-508.
Chen et al.; Deterministic Synthesis and Optical Properties of Glassy Chiral-Nematic Liquid Crystals; Chem. Mater., 2003, vol. 15; pp. 2534-2542.
Chen et al.; Glassy Liquid Crystal Films as Broadband Polarizers and Reflectors via Spatially Modulated Photoracemization; Advanced Materials, 1999, vol. 11, No. 14; pp. 1183-1186.
Chen et al.; Glassy Liquid-Crystal Films with Opposite Chirality as High-Performance Optical Notch Filters and Reflectors; Advanced Materials, 2000, vol. 12, No. 17; pp. 1283-1286.
Chen et al.; Novel glass-forming liquid crystals. IV. Effects of central core and pendant group on vitrification and morphological stability; Liquid Crystals, 1996, vol. 21, No. 5; pp. 683-694.
Chen et al.; Novel Glass-Forming Organic Materials. 1. Adamantane with Pendant Cholesteryl, Disperse Red 1, and Nematogenic Groups; Macromolecules, 1995, vol. 28; pp. 7775-7778.
Chen et al.; Novel Glass-Forming Organic Materials. 3. Cubane with Pendant Nematogens, Carbazole, and Disperse Red 1; Macromolecules, 1997, vol. 30; pp. 93-97.
Chen et al.; Novel Glassy Nematic Liquid Crystals for Non-destructive Rewritable Optical Memory and Photonic Switching; Advanced Materials, 2003, vol. 15, No. 13; pp. 1061-1065.
Chen et al.; Novel Vitrifiable Liquid Crystals as Optical Materials; Advanced Materials, 1996, vol. 8, No. 12; pp. 998-1001.
Chen et al.; Photoracemization broadening of selective reflection and polarization band of glassy chiral-nematic films; Liquid Crystals, 2000, vol. 27, No. 2; pp. 201-209.
Dehne et al.; Sulphur ligated Siamese twin mesogens; Liquid Crystals, 1989, vol. 6, No. 1; pp. 47-62.
De Rosa et al.; Dynamic Mechanical Relaxation Behavior of Low Molecular Weight Side-Chain Cyclic Liquid Crystalline Compounds near the Glass Transition Temperature; Macromolecules, 1996, vol. 29; pp. 5650-5657.
Fan et al.; Novel glass-forming liquid crystals V. Nematic and chiral-nematic systems with an elevated glass transition temperature; Liquid Crystals, 2000, vol. 27, No. 9; pp. 1239-1248.
Fan et al.; Novel Glass-Forming Liquid Crystals. 6. High-Temperature Glassy Nematics; Chem. Mater., 2001, vol. 13; pp. 4584-4594.
Gresham et al.; Phase Behavior of Cyclic Siloxane-Based Liquid Crystalline Compounds; Journal of Polymer Science: Part A: Polymer Chemistry, 1994, vol. 32; pp. 2039-2047.
Jackson et al.; An Investigation of the Role of Cross-Linking and Photodegradation of Side-Chain Coumarin Polymers in the Photoalignment of Liquid Crystals; Chem. Mater., 2001, vol. 13; pp. 694-703.
Katsis et al.; Vitrified Chiral-Nematic Liquid Crystalline Films for Selective Reflection and Circular Polarization; Chem. Mater., 1999, vol. 11; pp. 1590-1596.

(Continued)

*Primary Examiner* — Geraldina Visconti
(74) *Attorney, Agent, or Firm* — Hodgson Russ LLP

(57) ABSTRACT

A glassy cholesteric liquid crystalline composition comprising compounds with a volume-expanding core bound to one or more hybrid chiral-nematic (or Ch) pendant moieties and a method of producing oriented films of such compounds. The Ch pendant moieties are comprised of chiral spacer groups connected to the core via linker groups and nematic groups linked to the chiral spacer groups. Thin-films of the composition are morphologically stable for extended periods of time. Also, the thin-films are able to selectively interact with light from the visible to near-IR wavelength range.

18 Claims, 7 Drawing Sheets

(56) References Cited

OTHER PUBLICATIONS

Kim et al.; Effects of Dilution, Polarization Ratio, and Energy Transfer on Photoalignment of Liquid Crystals Using Coumarin-Containing Polymer Films; Macromolecules, 2008, vol. 41; pp. 3075-3080.
Kim et al.; New Insight into Photoalignment of Liquid Crystals on Coumarin-Containing Polymer Films; Macromolecules, 2006, vol. 39; pp. 3817-3823.
Kim et al.; Quantitative Assessment of Coumarin-Containing Polymer Film's Capability for Photoalignment of Liquid Crystals; Macromolecules, 2007, vol. 40; pp. 8924-8929.
Kreuzer et al.; Cyclic Siloxanes with Mesogenic Side Groups; Mol. Cryst. Liq. Cryst., 1991, vol. 199; pp. 345-378.
Kreuzer et al.; Liquid-Crystalline Silsesquioxanes; Makromol. Chem., Macromol. Symp., 1991, vol. 50; pp. 215-228.
Loddoch et al.; Novel glass-forming ferroelectric liquid-crystal material of high second-order nonlinearity; Applied Physics B, 1994, vol. 59; pp. 591-595.
Lorenz et al.; A Mesogen-Functionalized Carbosilane Dendrimer: A Dendritic Liquid Crystalline Polymer; Advanced Materials, 1996, vol. 8, No. 5; pp. 414-416.
Mastrangelo et al.; Crystallization upon thermal annealing of a glass-forming liquid crystal in the nematic regime; Appl. Phys. Let., Apr. 24, 1995, vol. 66, No. 17; pp. 2212-2214.
Obi et al.; Factors Affecting Photoalignment of Liquid Crystals Induced by Polymethacrylates with Coumarin Side Chains; Chem. Mater., 1999, vol. 11; pp. 656-664.
Percec et al.; Synthesis and Characterization of Cyclic Liquid Crystalline Oligomers Based on 1-(4-Hydroxy-4'- biphenylyl)-2-(4-hydroxyphenyl)butane and 1,10-Dibromodecane; Macromolecules, 1992, vol. 25; pp. 3851-3861.
Pfeuffer et al.; Vitrifying star-shaped liquid crystals: synthesis and application in cholesteric polymer networks; Liquid Crystals, 2002, vol. 29, No. 12; pp. 1555-1564.
Ponomarenko et al.; Carbosilane Liquid Crystalline Dendrimers: From Molecular Architecture to Supramolecular Nanostructures; Macromolecules, 2000, vol. 33; pp. 5549-5558.
Rauch et al.; Glass forming banana-shaped compounds: Vitrified liquid crystal states; Physical Review E 69, 2004; pp. 021707-1-021707-7.
Saez et al.; A Liquid-Crystalline Silsesquioxane Dendrimer Exhibiting Chiral Nematic and Columnar Mesophases; Chem. Eur. J., 2001, vol. 7, No. 13; pp. 2758-2764.
Saez et al.; Chiral nematic octasilsesquioxanes; Journal of Materials Chemistry, 2001, vol. 11; pp. 2845-2851.
Saez et al.; Segregated liquid crystalline dendritic supermolecules—multipedes based on pentaerythritol scaffolds; Journal of Materials Chemistry, 2003, vol. 13; pp. 2727-2739.
Schadt et al.; Optical patterning of multi-domain liquid-crystal displays with wide viewing angles; Nature, May 16, 1996, vol. 381; pp. 212-215.
Shi et al.; Effects of stereochemistry, mesogenic core and spacer length on crystallization from nematic and isotropic melts of cyclohexane-based glass-forming liquid crystals; Liquid Crystals, 1995, vol. 19, No. 6; pp. 785-790.
Shi et al.; Novel glass-forming liquid crystals II. Systems containing 1-phenyl-2-(6-cyanonaphth-2-yl)ethyne as a high optical birefringence moiety; Liquid Crystals, 1995, vol. 18, No. 5; pp. 733-741.
Shi et al.; Novel glass-forming liquid crystals. III Helical sense and twisting power in chiral nematic systems; Liquid Crystals, 1995, vol. 19, No. 6; pp. 849-861.
Shibaev et al.; Lasing from chiral photonic band gap materials based on cholesteric glasses; Liquid Crystals, Dec. 2003, vol. 30, No. 12; pp. 1391-1400.
Sorai et al.; Glassy Liquid Crystal of the Nematic Phase of N-(o-Hydroxy-p-methoxybenzylidene)-p-butylaniline; Short Communications, Oct. 1971; p. 2887.
Tamaoki et al.; Optical and thermal properties of cholesteric solid from dicholesteryl esters of diacetylenedicarboxylic acid; J. Mater. Chem., 1999, vol. 9; pp. 2381-2384.
Trajkovsha et al.; Photoalignment of a Nematic Liquid Crystal Fluid and Glassy-Nematic Oligofluorenes on Coumarin-Containing Polymer Films; Macromolecules, 2006, vol. 39; pp. 6983-6989.
Tsuji et al.; New Finding of Glassy Liquid Crystal—a Non-equilibrium State of Cholesteryl Hydrogen Phthalate; Short Communications; J. Chem. Phys.,vol. 44, No. 5; p. 1452.
Van De Witte et al.; Optical components from a new vitrifying liquid crystal; Liquid Crystals, 1999, vol. 26, No. 7; pp. 1039-1046.
Wallace et al.; Simplified Scheme for Deterministic Synthesis of Chiral-Nematic Glassy Liquid Crystals; Ind. Eng. Chem. Res., 2006, vol. 45; pp. 4494-4499.
Wedler et al.; Vitrification in Low-molecular-weight Mesogenic Compounds; J. Mater. Chem., 1991, vol. 1, No. 3; pp. 347-356.
Yao et al.; Synthesis and mesomorphism of novel star-shaped glassy liquid crystals containing pentaerythritol esters; Tetrahedron Letters, 2004, vol. 45; pp. 8953-8956.

\* cited by examiner (a)

(c)

(b)

(d)

i)

VIII at 174 °C, oily streaks

1

CHOLESTERIC GLASSY LIQUID CRYSTALS WITH HYBRID CHIRAL-NEMATIC MESOGENS

CROSS-REFERENCE TO RELATED APPLICATIONS

This application claims priority to U.S. Provisional Patent Application No. 61/096,044, filed Sep. 11, 2008, the disclosure of which is incorporated herein by reference.

FIELD OF THE INVENTION

The present invention is related to glassy liquid crystalline compositions, and more particularly, the present invention is related to cholesteric glassy liquid crystalline compositions having hybrid chiral-nematic groups.

BACKGROUND OF THE INVENTION

Liquid crystals are spontaneously ordered fluids characterized by a uniaxial, lamellar, helical, or columnar arrangement in nematic, smectic, cholesteric, or discotic mesophase, respectively. By preserving these molecular arrangements in the solid state via cooling through glass transition temperature ($T_g$), glassy liquid crystals (GLCs) represent a unique material class potentially useful for organic optoelectronics. Whereas all liquids are expected to vitrify at a sufficiently rapid cooling rate, most organic materials, including liquid crystals, tend to crystallize upon cooling through the melting point, $T_m$. Crystallization of liquid crystals essentially destroys the desired molecular order that prevails in the fluid state, resulting in polycrystalline films that scatter light or impede charge transport.

The first known or reported attempt to synthesize GLCs in 1971 yielded materials with a low $T_g$ and poor morphological stability, namely, the tendency to crystallize from the glassy state. Subsequent efforts have produced GLCs that can be categorized into (i) laterally or terminally branched, one-string compounds with a $T_g$ mostly around room temperature; (ii) twin molecules with an above-ambient $T_g$ but generally lacking morphological stability; (iii) cyclosiloxanes functionalized with mesogenic and chiral pendants; (iv) carbosilane dendrimers exhibiting a low $T_g$; (v) macrocarbocycles with mesogenic segments as part of the ring structure; and (vi) pentaerythritol as the central core to yield widely varying $T_g$ and morphological stability. In particular, cholesteric GLCs are potentially useful as large area non-absorbing polarizers, optical notch filters and reflectors, and polarizing fluorescent films. Moreover, cholesteric GLC films can serve as a one-dimensional photonic bandgap for circularly polarized lasing. Comprising separate chiral and nematic pendants, cholesteric GLCs have been synthesized either by a statistical approach, which requires intensive workup procedures to arrive at pure components, or by deterministic approaches, which require long synthesis schemes.

Cholesteric GLCs with hybrid pendants having both chiral and nematic moieties chemically bonded to a volume-excluding core addresses the problems of complexity and cost associated with previous cholesteric GLC systems with separate chiral and nematic pendants. However, previous attempts at hybrid pendants have met with little or no success. For example, hybrid pendants with a chiral tail yielded exclusively smectic mesomorphism (Delavier et al., U.S. Pat. No. 5,840,097), and cyanotolan with a chiral spacer to a cyclohexane core failed to achieve mesomorphism (Shi et al., *Liq. Cryst.*, 1994, 17, 413).

Based on the foregoing, there is an ongoing unmet need for cost effective preparation of cholesteric glassy liquid crystals with elevated phase transition temperatures, stability against crystallization from the glassy state, and selective reflection across the visible to near infrared region.

BRIEF SUMMARY OF THE INVENTION

In one aspect, the present invention provides cholesteric GLC compositions comprising compounds with the following general structure:

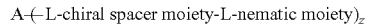

A-(-L-chiral spacer moiety-L-nematic moiety)$_z$

The compounds comprise a volume-excluding core (VEC) (A) and at least one hybrid chiral-nematic pendant moiety (Ch), which is a hybrid pendant moiety with a chiral spacer moiety connected (via a chemical bond) by a linker group (L) to a nematic moiety.

The Ch pendants are constructed by combining rigid nematic moieties with flexible chiral spacers intended to partially decouple nematic moieties from volume-excluding cores with a degree of chiral preference to induce the formation of cholesteric mesoporphism. The geometric dissimilarity between the core and the pendant structures is essential to the formation of glassy liquid crystals and their stability against crystallization.

The GLC materials of the present invention have desirable mechanical properties for device fabrication and durability. The materials have film- and fiber-forming abilities and morphological stability (e.g., the monodomain cholesteric GLC films retain a glassy state and preserve high orientational order without crystallization). We have GLC films which have been morphologically stable for at least 3 years.

In one embodiment, the GLC compositions of the present invention are formed as thin films (e.g., deposited by melt processing or spin coating). Such thin films can range in film thickness from 2 to 22 microns depending on the material types and the spectral range of interest.

In another embodiment, the GLC compositions of the present invention are formed as fibers. For example, such fibers can be used in optical communication applications.

In one aspect, the present invention provides a method for preparing oriented thin films of cholesteric glassy thin films. The method comprises the steps of: (a) depositing a thin film of an alignment polymer on a substrate; (b) irradiating the polymer with linearly polarized ultraviolet radiation to create a thin film such that the of the polymer molecules are oriented relative to the direction of the linear polarization of the ultraviolet radiation; (c) depositing a thin film of the composition of claim 1 on alignment surface from step b); and (d) annealing the substrate from c) at a temperature above the glass transition temperature of the composition of claim 1, which is the $T_g$ of the compound comprising the composition. Optionally, a second substrate is provided which is prepared according to steps a) and b) above. This substrate is placed on the substrate from c) prior to annealing such that the alignment surface of the second substrate is opposed to the thin film of composition 1 on the substrate from c) and the molecular alignment of the two substrates is the same.

The compositions of the present invention can be used in applications of chiral liquid crystalline materials in organic optical devices requiring compositions capable of forming both right- and left-handed helical structures. Chiral-nematic liquid crystalline compositions of the present invention, which form clear, transparent films that absorb no light in the visible region but do selectively reflect visible and near-infrared circularly-polarized light, are especially useful large-area non-absorbing (circular) polarizers, optical notch filters, reflectors (mirrors), polarizing fluorescent films and lasers (e.g. one-dimensional photonic bandgap for circularly polarized lasing).

DESCRIPTION OF INVENTION

Figure 1A:
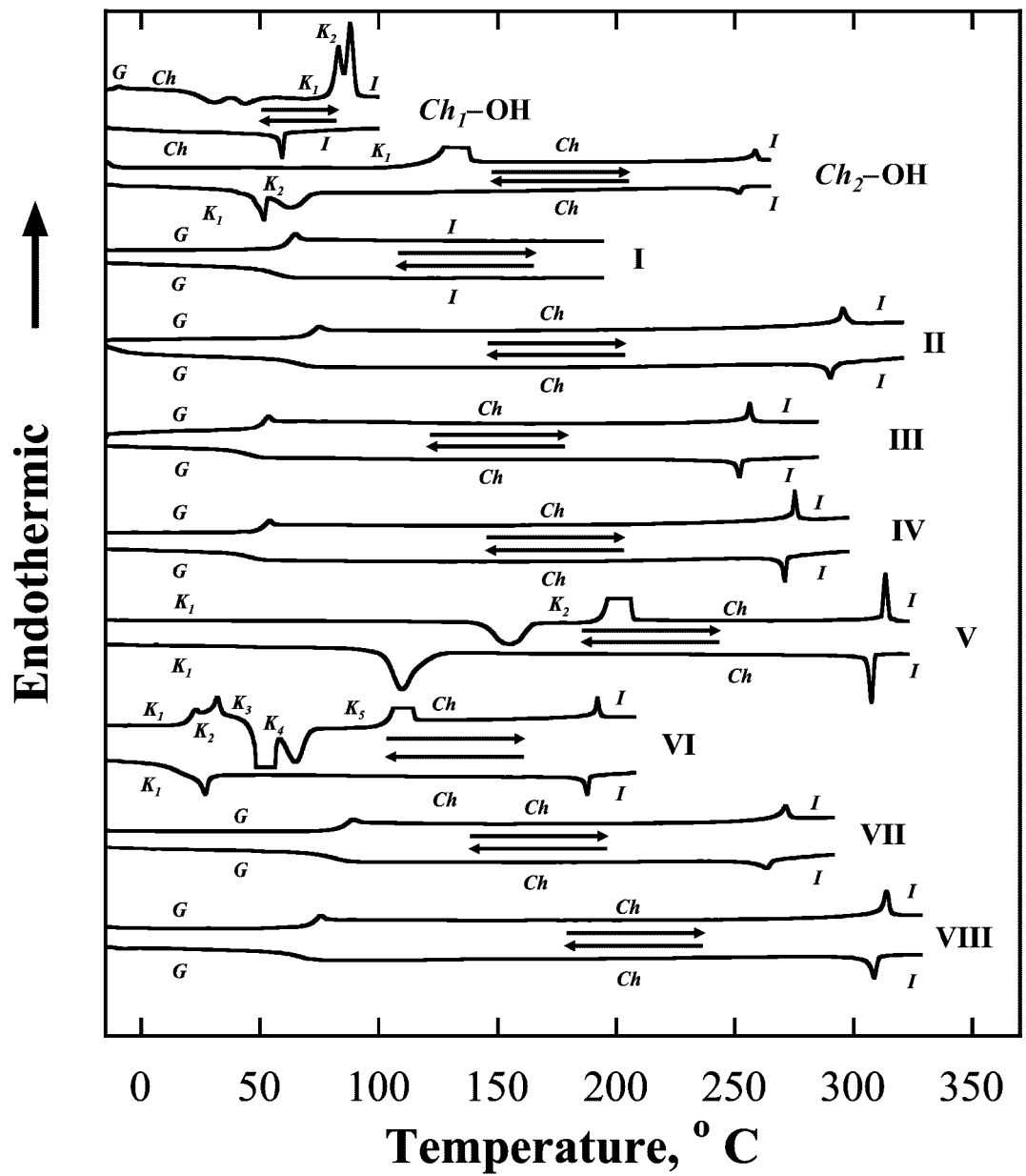
FIG. 1. (a) Differential scanning calorimetric heating and cooling scans of $Ch_1$-OH, $Ch_2$-OH, and I through VIII at 20° C./min of samples preheated to beyond clearing points followed by cooling to −30° C. Symbols: G, glassy; K, crystalline; Ch, cholesteric; I, isotropic. (b) Differential scanning calorimetric heating and cooling scans of IX-XI at 20° C./min of samples preheated to beyond clearing points followed by cooling to −30° C. Symbols: G, glassy; Ch, cholesteric; I, isotropic.

In one aspect, the present invention provides cholesteric GLC compositions comprising compounds with the following general structure:

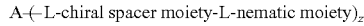

A–(L-chiral spacer moiety-L-nematic moiety)$_z$

The compounds comprise a volume-excluding core (VEC) (A) and at least one hybrid chiral-nematic pendant moiety (Ch), which is a hybrid pendant moiety with a chiral spacer moiety connected (via a chemical bond) by a linker group (L) to a nematic moiety. The number of potential Ch moieties is dependant on the structure of the VEC, e.g. a phenyl VEC can be substituted with 1 to 3 Ch groups. The number of Ch groups, z, is from 1 to 20, including all integers from 1 to 20. The chiral spacer moiety of the hybrid chiral-nematic group is connected to the VEC by a linker group (L).

The Ch pendants are constructed by combining rigid nematic moieties with flexible chiral spacers intended to partially decouple nematic moieties from volume-excluding cores with a degree of chiral preference to induce the formation of cholesteric mesoporphism. The geometric dissimilarity between the core and the pendant structures is essential to the formation of glassy liquid crystals and their stability against crystallization.

In one embodiment, all substitutions on the VEC are Ch moieties. For example, see compounds I, II, and IV in Chart 1. In another embodiment, the VEC is substituted with at least one Ch moiety and at least one moiety that is not a Ch moiety (for example, see compounds VI (substituted with a nematic moiety) and VII (substituted with an acid moiety) in Chart 1). Other examples of non-Ch moieties include alkyl moieties and alkylaryl moieties, either of which can be unsaturated or otherwise substituted with functional groups such as alcohols, halogens, nitriles, isonitriles, ether, esthers, amides, and the like. The nematic moities discussed herein are also examples of non-Ch moieties.

The VEC is a single ring or multi-ring structure with one or more substitution points which can be substituted with Ch groups. Each ring of the single ring or multi-ring structure independently has 4 to 8 carbons, including all integers between 4 and 8. Examples of multi-ring structures are multiple rings which are directly connected, multiple rings with common carbons, or fused-ring structures, and the like. The number of rings in a multi-ring structure can be from 2-10, including all integers between 2 and 10. Examples of VECs include, but are not limited to, a phenyl ring, a cyclohexane ring, a (1s,4s)-bicyclo[2.2.2]oct-2-ene multi-ring structure, an adamantane (tricycle[3.3.1.1$^{3,7}$]) multi-ring structure, or a cubane (pentacyclo[4.2.0$^{2,5}$.0$^{3,8}$.0$^{4,7}$]) multi-ring structure. In various embodiments, the VEC is a monosubstituted phenyl ring, a 1,3-substituted phenyl ring, or 1,3,5-substituted phenyl ring.

In one embodiment, the VECs can comprise at least one expander moiety (E). The expander moiety is comprised of a linker group (L) and an expander ring structure (ER) which is a single ring or a multi-ring structure. The expander moiety is connected to one or more Ch moieties, can increase the number of possible chiral-nematic group substitution positions on the VEC. Each ring of the single ring or multi-ring structure independently has 4 to 8 carbons, including all integers between 4 and 8. Examples of single ring expander ring structures include phenyl rings, cyclohexyl rings, or pyridine rings. An example of a multi-ring expander ring structure is a naphthalene ring. The number of E moieties is 1 to 10, including all integers from 1 to 10. An example of an expander moiety is a phenyl ring connected to the VEC by a linker group (such as an ester group).

In one embodiment the compounds of the present invention have the following general structure:

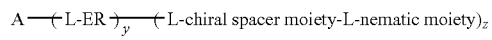

A–(L-ER)$_y$–(L-chiral spacer moiety-L-nematic moiety)$_z$

The number E groups, y, is from 1 to 10, including all integer in between 1 and 10. The number of Ch groups, z, is from 1 to 20.

The following are examples of VECs:

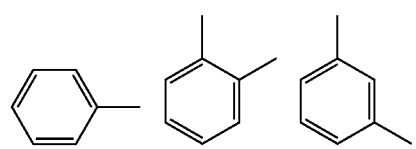

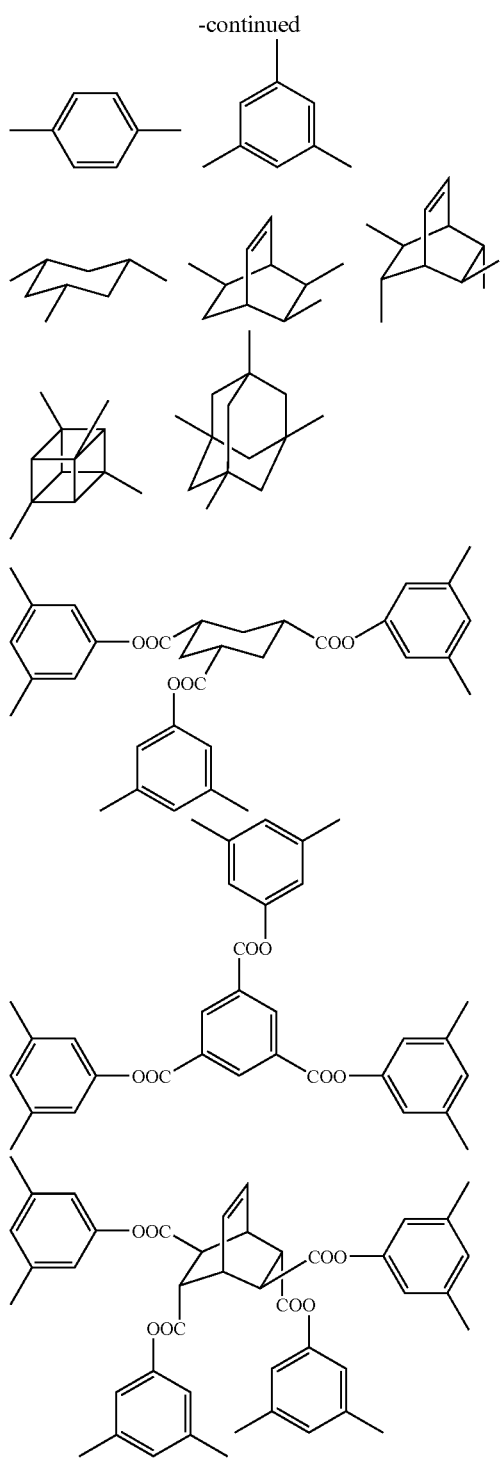
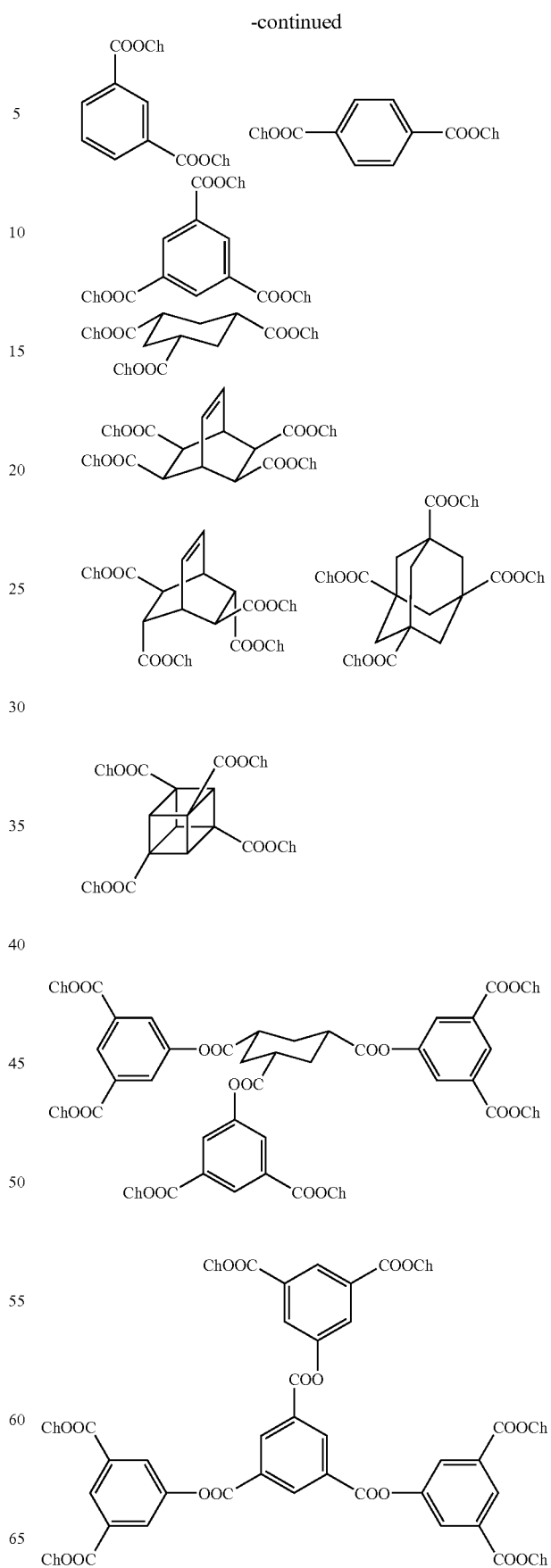
Examples of compounds of the present invention include, but are not limited to, the following.
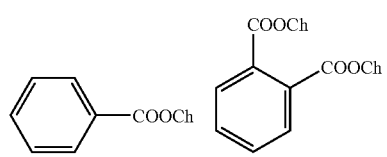

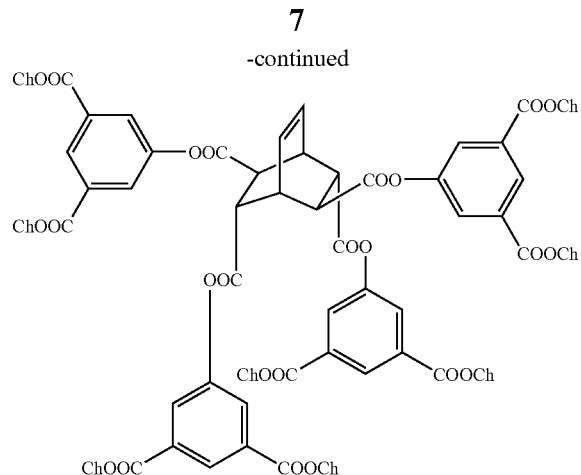

The chiral spacer moiety of the Ch moiety has at least one chiral center. For example, the chiral spacer moiety is an alkyl chain of 2 to 15, including all integers between 2 and 15, carbons and contains one or two chiral centers. The chain, optionally, includes one or more functional group(s) such as ester or amide groups. The chiral spacer should have sufficient flexibility to enable the Ch pendant groups to self-organize Examples of molecules used to form chiral spacer moieties include, but are not limited to, the following:

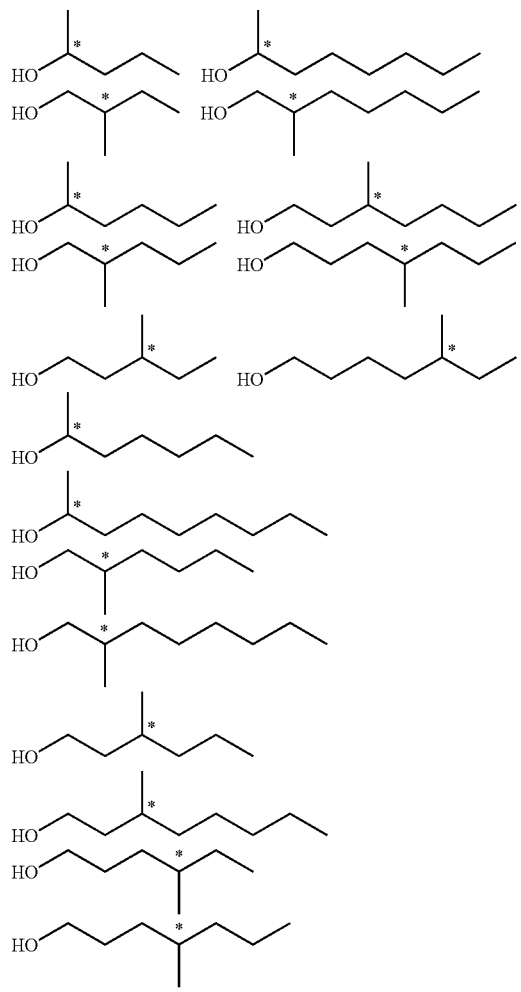

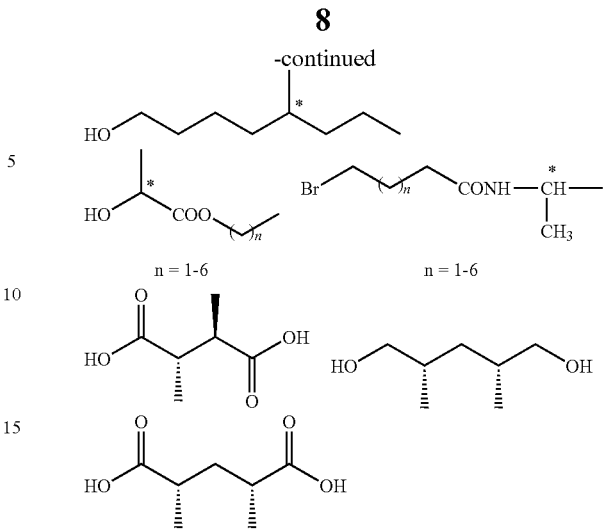

The chiral spacer groups shown above have a functional group, e.g., a hydroxyl group or bromide, which is reacted to join the spacer, or spacer-linker, or spacer-linker-nematic group to the VEC or expander group via a linker.

A linker group (L) is any functional group that can be used to connect the core and the expander ring of the expander moiety, the chiral spacer moiety with the core or expander moiety, and the chiral spacer moiety with the nematic moiety. Either terminus of the functional group can be used to connect either moiety. Examples of functional groups which can be linker groups include, but are not limited to, the following:

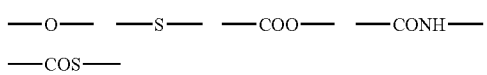

The nematic moiety is joined to the chiral spacer group by a linker group. Structures with a stable nematic liquid crystalline phase are suitable nematic moities. The nematic moiety is a multi-aromatic ring aromatic moiety. For example, the nematic moiety can have 2 to 15, including all integers in between 2 and 15, aromatic rings. The aromatic rings can be present as fused-ring structures (e.g., a naphthalene structure) or non-fused ring structures (e.g., a biphenyl structure) or individual rings. Individual adjacent rings (or ring structures) can be connected directly, such as by a single bond, or via an unsaturated alkyl chain comprising two carbons (e.g., a ethylene moiety) or a functional group such as an ether, esther, amide, thioether, thioesther, or the like. The moiety can be completely conjugated or partially conjugated. The moiety can include carbon-carbon multiple bonds (alkenyl or alkynl groups) which can conjugate different ring structures in the moiety. Without intending to be bound by any particular theory, it is considered that the nematic moiety provides rigidity to the molecule due to planar conjugation in the moiety. Examples of nematic moieties useful in the compounds of the present invention include, but are not limited to, the following:

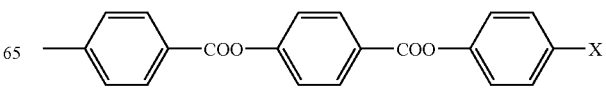

-continued

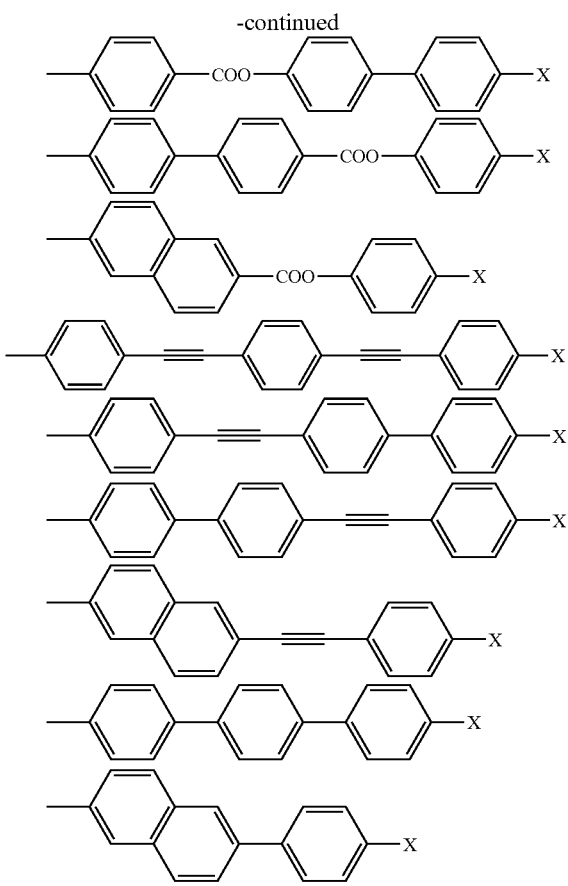

The nematic moieties can be substituted, as indicated by the X group in the structures above, or un-substituted, in which case X is a hydrogen. Groups suitable for substitution include, halides, nitro groups, alkyl groups, alkoxy groups, cyano and isocyano groups, and thiocyano and isothiocyano groups, and the like. Examples of X groups as substituents on the nematic moiety useful in the present invention, include but are not limited to, the following:

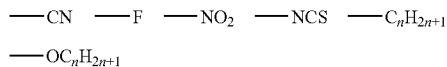

The compounds of the present invention can have molecular weights ranging from 500 to 5000 amu. In one embodiment, the GLC materials of the present invention have a molecular weight of less than 2000 amu.

While the core and hybrid pendants are crystalline as separate entities, the chemical hybrid, with a proper flexible chiral spacer moiety connecting the two, readily vitrifies into a GLC structure on cooling.

In one embodiment, the GLC compositions consist essentially of the compounds of the present invention. In another embodiment, the GLC compositions consist of the compounds of the present invention. In various other embodiments, the GLC compositions of the present invention comprise, consist essentially of, or comprise one or more of the compounds of the present invention.

The compounds comprising the GLC compositions of the present invention can be synthesized using a variety of synthetic methodologies, including single-step and multi-step processes. For example, the compounds can be synthesized starting with the core and adding each successive component (e.g., linker(s), chiral spacer moiety/moieties, linker group(s), and nematic moiety/moieties). As another example, the Ch group could be independently synthesized and the pre-prepared Ch group reacted with the linker group, the combination of which is then connected with the core, or the core, which had already been reacted with linker group(s). As yet another example, individual parts of the compound can be pre-prepared and these pre-prepared parts reacted to form the compound (e.g., a core-linker-chiral spacer part and a linker-nematic moiety part can be pre-prepared and subsequently, reacted to form the desired compound). In any of these examples, the components can contain reactive groups which are not part of the final compound. Illustrations of the preparation of exemplary compounds are provided in the Examples.

The compounds of the present invention can be synthesized in a cost-effective manner. The synthesis of previous compounds used to form GLCs employed synthetic schemes based on costly and time-consuming protection-deprotection and separation methodology. The protection-deprotection methodology requires multiple steps. In one example, this methodology requires six steps. In comparison, compounds of the current invention can be synthesized in a single step (assuming the Ch pendant groups have been separately prepared). In addition to the savings in materials costs and time, the efficiency of the preparation of compounds of the present invention is increased. For example, compounds of the present invention have been prepared with a 70% yield as compared to previous GLC precursors which were prepared with a yield of less than 10%.

As an example of compounds of the present invention, cholesteric GLCs were successfully developed using 4'-cyanobiphenyl-4-yl benzoate nematogens and enantiomeric 2-methylpropylene spacers to a phenyl ring core. A systematic investigation of these compounds was conducted for mesomorphic behavior, morphological stability, and optical properties in relation to the extent of substitution and regioisomerism. Amenability to photo-alignment on coumarin-containing polymer films was also tested with a morphologically stable cholesteric GLC of the present invention. Key findings regarding the compounds of this system are recapitulated as follows:

Glass-forming ability generally improves with an increasing substitution with hybrid chiral-nematic mesogens on the benzene ring. The para-disubstituted and the monosubstituted systems lack glass-forming ability for the compounds of this system. With respect to the substituted benzene systems, with $T_g$ at 73° C. and $T_c$ at 295° C., the 1,3,5-trisubstituted system is preferred. Left at room temperature for months, the cholesteric GLC films prepared with meta- and ortho-isomers in addition to 1,3,5-trisubstituted system have remained non-crystalline, evidence of superior morphological stability.

Morphologically stable cholesteric GLC films based on compounds of the present invention were characterized for their selective reflection properties. Left-handed helical stacking emerged with (S)-3-bromo-2-methylpropanol as the chiral precursor. Films of the 1,3,5-trisubstituted and meta-disubstituted systems show a $\lambda_R$ at 413 and 422 nm, respectively, whereas that of the ortho-isomer system exhibits a $\lambda_R$ at 860 nm. Replacing one of the hybrid chiral-nematic mesogens in the 1,3,5-trisubstituted system by a nematogen loosens the helical pitch to yield a $\lambda_R$ at 630 nm, still shorter than the ortho-isomer despite the dilution by nematogen. Computational chemistry revealed the closer packing involving chiral spacers in the meta-isomer than the ortho-isomer, thus the stronger helical twisting in the former than the latter.

The ortho-isomer is amenable to photo-alignment on films of methacrylate homopolymers and a maleimide-norbornene copolymer containing pendant coumarin monomers to a varying extent. With an extent of coumarin dimerization of about 0.25 as a result of linearly polarized UV-irradiation, the films of a methacrylate polymer with a hexamethylene spacer produced a 7 µm-thick monodomain cholesteric GLC film with selective reflection properties equivalent to mechanical alignment on rubbed polyimide films. In contrast, the rigid and bulky polymer backbone and the short flexible spacer in the maleimide-norbornene copolymer produced a polydomain cholesteric GLC film with inferior selective reflection characteristics. These observations were interpreted by the rotational mobility of pendant coumarin monomers relative to the polarization axis of irradiation.

The GLC materials of the present invention have desirable mechanical properties for device fabrication and durability. The materials have film- and fiber-forming abilities and morphological stability (e.g. the monodomain cholesteric GLC films retain a glassy state and preserve high orientational order without crystallization). In one embodiment, morphological stability means that films of the GLC materials do not exhibit detectable (such as by microscopy or x-ray diffraction) for a period of time when stored at ambient temperature (e.g., 65-70° C.). For example, the materials can be stable for 6 months, 1 year, or 2 years. We have GLC films which have been morphologically stable for at least 3 years.

Conventional liquid crystal polymers are generally difficult to fabricate into large-area thin films due to high melt viscosity. However, because of their chemical purity, favorable rheological properties, and short and uniform mechanical relaxation time, the GLC materials can be processed into defect-free films. For example, the GLC materials can be melt processed for use in optical elements.

In one embodiment, the GLC compositions of the present invention are formed as (e.g. deposited by melt processing) thin films. Such thin films can range in film thickness from 2 to 22 microns depending on the material types and the spectral range of interest. The thin films can be deposited over an area of up to, for example, one ft by one ft by vacuum filling the gap above the glass transition temperature ($T_g$) between glass substrates. In another embodiment, the GLC compositions of the present invention are formed as fibers. For example, such fibers can be used in optical communication applications.

In one aspect, the present invention provides a method for preparing oriented thin films of cholesteric glassy thin films. The method comprises the steps of: (a) depositing a thin film of an alignment polymer on a substrate; (b) irradiating the polymer with linearly polarized ultraviolet radiation to create a thin film the surface of which is an alignment surface, such that the polymer molecules are oriented relative to the direction of the linear polarization of the ultraviolet radiation; (c) depositing a thin film of the composition of claim 1 on alignment surface from step b); and (d) annealing the substrate from c) at a temperature above the $T_g$ of the composition of claim 1. Optionally, a second substrate coated with a thin film of a same or different alignment polymer prepared according to steps a) and b) above is provided. This substrate is placed on the substrate from c) prior to annealing such that the alignment surface of the second substrate is apposed to the thin film of composition 1 on the substrate from c) and the molecular alignment of the two substrates is the same.

The annealing step results in a film of composition 1 that is oriented. By oriented is it meant that the molecular axes of the liquid crystals of the thin film are uniaxially oriented relative to a predetermined direction (i.e., the direction dictated by the linearly polarized irradiation used to prepare the alignment polymer or alignment polymers in the case where two alignment surfaces are used).

The orientation can be assessed by determining the optical properties of the oriented film. For example, a film is oriented if on impinging unpolarized light on a thin film 40-50%, including all integers between 40 and 50%, of the light is reflected or transmitted and/or the degree of circular polarization of the reflected and/or transmitted light is 90 to 100%, including all integers between 90 and 100%. Based on these values the orientational order parameter can be calculated.

The substrate can be any planar surface on which a thin film of the alignment polymer can be deposited. For example, glass substrates can be used.

The alignment polymer is any polymer which on irradiation with linearly polarized UV radiation (typically, 300 to 320 nm) creates a surface which can orient a thin film of the composition of claim 1 when the composition is annealed. After irradiation, the alignment polymer should be such that a thin film of the composition of claim 1 can be formed on the exposed surface of the alignment polymer thin film. For example, after irradiation the alignment polymer should be insoluble in common solvents (e.g., chloroform). Examples include the coumarin-containing polymers discussed in Example 1 (e.g., methacrylate homopolymers, maleimide-norbornene copolymers containing varying numbers of pendant coumarin monomers), cinnamate-based polymers and azobenzene-based polymers.

The axis selectivity of the alignment polymer determines whether the polymer molecules are oriented parallel or perpendicular to the direction of the linearly polarized light. For example, for maleimide-norbornene copolymers containing varying numbers of pendant coumarin monomers the degree of coumarin monomer dimerization can be from 0.2 to 0.5 while maintaining molecular orientation of the alignment polymer parallel to the linearly polarized ultraviolet radiation used to irradiate the polymer.

The annealing step is carried out at temperatures above the $T_g$ of the composition of claim 1 used to form the thin film on the alignment substrate. The annealing temperature should be such that thin film of the GLC composition of claim 1 is not degraded. For example, temperatures of 1 to 25 degrees Celsius, including all integers between 1 and 25 degrees Celsius, above the $T_g$ can be used. In another example, temperatures of 10 to 15 degrees Celsius, including all integers between 10 to 15 degrees Celsius, above the $T_g$ can be used. The annealing step is carried out until the thin-film is oriented. Typically, the annealing step is carried out for 15 to 30 minutes, depending on the composition and film thickness used.

In another aspect, the present invention provides an oriented thin film comprising a GLC composition of the present invention. In one embodiment, the oriented thin-film is present on a substrate. In another embodiment, the oriented thin film is present as a one layer of a multilayer composition of one or more thin-films, and molecular axes of the composition are uniaxially ordered. For example, the multilayer composition can include a substrate, an alignment polymer thin film, and an oriented GLC thin film. As another example, the film stack can include a substrate, an alignment polymer thin film, an oriented GLC thin film, an alignment polymer thin film, and another substrate.

Optical quality films prepared from GLC materials of the present invention can be used for circular polarizers, circular-polarized fluorescence films, optical notch filters and reflectors, filters for laser protection, latching electro-optical devices for optical communication, and low-threshold and efficient circularly polarized lasers.

The supramolecular structure of a chiral-nematic liquid-crystal film comprised of GLC compositions of the present invention can be described a cholesteric mesophase that includes a helical stack of quasi-nematic layers in the Grandjean (or homogeneous) orientation, which is characterized by handedness and helical pitch length, p. Handedness describes the direction in which twisting of the nematic director occurs from one layer to the next, and p is defined as the distance over which the director rotates by 360°. The property of selective reflection can be described in terms of $\lambda_R = p(n_e + n_o)/2$, in which $n_e$ and $n_o$ are the extraordinary and ordinary refractive indices of the quasi-nematic layer, respectively. When unpolarized white light, which consists of equal amounts of left-handed (LH) and right-handed (RH) circularly polarized components, propagates through a LH film the LH circularly polarized component in the neighborhood of $\lambda_R$ is selectively reflected, while the RH component is completely transmitted. A sufficiently thick, singlehanded cholesteric film is capable of reflecting 50% of incident unpolarized light within the selective reflection band. Outside the selective reflection band, incident light is transmitted regardless of its polarization state. It follows that a stack of RH and LH chiral-nematic films (or a single film comprising both RH and LH chiral-nematic films) tuned at the same $\lambda_R$ will reflect 100% of incident unpolarized light within the selective reflection band without attenuating the rest of the spectrum.

For example 2 to 22 micron, including all integers between 2 and 22 microns, thick films of the GLC compositions are typically sufficient to reflect/transmit light with wavelengths from visible (blue) wavelengths to near-IR wavelengths. Generally, the film thickness and refractive index of the GLC composition(s) will dictate what wavelengths of light interact with the films (e.g., GLC compositions with a high refractive index will require thinner films to reflect/transmit light relative to compositions with a lower refractive index.

The compositions of the present invention can be used in applications of chiral liquid crystalline materials in organic optical devices requiring compositions capable of forming both right- and left-handed helical structures. When a film of such a composition is applied to a substrate or surface, the helical structures are capable of forming and maintaining the Grandjean texture, in which the helical axis is perpendicular to the substrate surface, to enable the selective reflection of circular-polarized light. An enantiomeric chiral pair of liquid crystalline compositions of the present invention prepared into two separate films, characterized as a right-handed and a left-handed helix, are capable of selectively reflecting right-handed and left-handed circular-polarized light, respectively. Chiral-nematic liquid crystalline compositions of the present invention, which form clear, transparent films that absorb no light in the visible region but do selectively reflect visible and near-infrared circularly-polarized light, are especially useful large-area non-absorbing (circular) polarizers, optical notch filters, reflectors (mirrors), polarizing fluorescent films and lasers (e.g. one-dimensional photonic bandgap for circularly polarized lasing).

The following examples are presented to illustrate the present invention. They are not intended to limiting in any manner.

EXAMPLE 1

Synthesis and Characterization of Specific Compounds of the Present Invention

Materials and Methods
Material Synthesis.

All chemicals, reagents, and solvents were used as received from commercial sources without further purification except tetrahydrofuran (THF) that had been distilled over sodium and benzophenone. The following intermediates were synthesized according to literature references: 1,3,5-benzenetricarboxylic acid, 1-tert-butyl ester, 4-(3-hydroxy-propoxy) benzoic acid 4'-cyanobiphenyl-4-yl ester (Nm-OH), and 7-[4-[(3-hydroxypropoxy)-benzoyloxy]-coumarin. Compounds I through VIII and Polymer C for photo-alignment, as depicted in Charts 1 and 2, were synthesized according to Reaction Schemes 1 and 2, respectively. Synthesis, purification, and characterization of Polymers A and B have been reported previously, and those for the intermediates are included in the following.

1,3,5-Benzenetricarboxylic acid, tris[(R)-3-[(4'-cyanobiphenyl-4-yl)oxy]-2-methyl propyl]ester, I. To a solution of 1,3,5-benzenetricarboxylic acid (0.063 g, 0.30 mmol), $Ch_1$-OH (0.25 g, 0.94 mmol), and triphenylphosphine (TPP) (0.26 g, 1.0 mmol) in anhydrous tetrahydrofuran (3.1 mL), diethyl azodicarboxylate (DEADC) (0.19 g, 1.1 mmol) was added dropwise. The reaction was stirred under argon at room temperature overnight. The solvent was then removed under reduced pressure, and the solid residue was purified by gradient column chromatography on silica gel with 0 to 2% acetone in methylene chloride. The product was collected by precipitation from a methylene chloride solution into methanol to yield I (0.15 g, 53%). Anal. Calcd.: C, 75.22%; H, 5.37%; N, 4.39%. Found: C, 75.08%; H, 5.53%; N, 4.09%. $^1$H NMR spectral data (400 MHz, CDCl$_3$): δ (ppm) 1.22 (d, 9H, —CH$_3$), 2.54 (m, 3H, —CH$_2$CH(CH$_3$)CH$_2$—), 4.04 (d, 6H, —CH$_2$OAr), 4.48 (m, 6H, —COOCH$_2$—), 7.01 (d, 6H, aromatics), 7.53 (d, 6H, aromatics), 7.64 (d, 6H, aromatics), 7.70 (d, 6H, aromatics), 8.87 (s, 3H, aromatics).

1,3,5-Benzenetricarboxylic acid, tris[(R)-3-[4-[(4'-cyanobiphenyl-4-yl)oxycarbonyl]phenoxy]-2-methylpropyl]ester, II. The procedure for the synthesis of I was followed to prepare II using Ch$_2$-OH (0.41 g, 1.1 mmol) instead of Ch$_1$-OH in 66% yield (0.29 g). Anal. Calcd.: C, 73.79%; H, 4.82%; N, 3.19%. Found: C, 73.66%; H, 4.65%; N, 3.13%. $^1$H NMR spectral data (400 MHz, CDCl$_3$): δ (ppm) 1.21 (d, 9H, —CH$_3$), 2.55 (m, 3H, —CH$_2$CH(CH$_3$)CH$_2$—), 4.06 (d, 6H, —CH$_2$OAr), 4.47 (m, 6H, —COOCH$_2$—), 6.98 (d, 6H, aromatics), 7.29 (d, 6H, aromatics), 7.62 (d, 6H, aromatics), 7.66 (d, 6H, aromatics), 7.72 (d, 6H, aromatics), 8.14 (d, 6H, aromatics), 8.85 (d, 3H, aromatics).

1,2-Benzenedicarboxylic acid, bis[(R)-3-[4-[(4'-cyanobiphenyl-4-yl)oxycarbonyl]phenoxy]-2-methylpropyl]ester, III. The procedure for the synthesis of II was followed to prepare III using 1,2-benzenedicarboxylic acid (0.031 g, 0.18 mmol) instead of 1,3,5-benzenetricarboxylic acid in 54% yield (0.090 g). Anal. Calcd.: C, 74.32%; H, 4.90%; N, 3.10%. Found: C, 73.90%; H, 4.56%; N, 3.04%. $^1$H NMR spectral data (400 MHz, CDCl$_3$): δ (ppm) 1.15 (d, 6H, —CH$_3$), 2.45 (m, 2H, —CH$_2$CH(CH$_3$)CH$_2$—), 4.01 (m, 4H, —CH$_2$OAr), 4.35 (m, 4H, —COOCH$_2$—), 6.98 (d, 4H, aromatics), 7.29 (d, 4H, aromatics), 7.55 (m, 2H, aromatics), 7.61 (d, 4H, aromatics), 7.66 (d, 4H, aromatics), 7.71 (m, 6H, aromatics), 8.13 (d, 4H, aromatics).

1,3-Benzenedicarboxylic acid, bis[(R)-3-[4-[(4'-cyanobiphenyl-4-yl)oxycarbonyl]phenoxy]-2-methylpropyl]ester, IV. The procedure for the synthesis of II was followed to prepare IV using 1,3-benzenedicarboxylic acid (0.031 g, 0.18 mmol) instead of 1,3,5-benzenetricarboxylic acid in 78% yield (0.13 g). Anal. Calcd.: C, 74.32%; H, 4.90%; N, 3.10%. Found: C, 74.08%; H, 4.50%; N, 3.03%. $^1$H NMR spectral data (400 MHz, CDCl$_3$): δ (ppm) 1.21 (d, 6H, —CH$_3$), 2.54 (m, 2H, —CH$_2$CH(CH$_3$)CH$_2$—), 4.06 (m, 4H, —CH$_2$OAr), 4.45 (m, 4H, —COOCH$_2$—), 6.98 (d, 4H, aromatics), 7.30 (d, 4H, aromatics), 7.55 (t, 1H, aromatics), 7.62 (d, 4H, aromatics), 7.67 (d, 4H, aromatics), 7.72 (d, 4H, aromatics), 8.15 (d, 4H, aromatics), 8.23 (d, 2H, aromatics), 8.69 (s, 1H, aromatics).

1,4-Benzenedicarboxylic acid, bis[(R)-3-[4-[(4'-cyanobiphenyl-4-yl)oxycarbonyl]phenoxy]-2-methylpropyl]ester, V. The procedure for the synthesis of II was followed to prepare V using 1,4-benzenedicarboxylic acid (0.031 g, 0.18 mmol) instead of 1,3,5-benzenetricarboxylic acid in 75% yield (0.13 g). Anal. Calcd.: C, 74.32%; H, 4.90%; N, 3.10%. Found: C, 73.95%; H, 4.57%; N, 3.07%. $^1$H NMR spectral data (400 MHz, CDCl$_3$): δ (ppm) 1.21 (d, 6H, —CH$_3$), 2.55 (m, 2H, —CH$_2$CH(CH$_3$)CH$_2$—), 4.07 (m, 4H, —CH$_2$OAr), 4.45 (m, 4H, —COOCH$_2$—), 6.98 (d, 4H, aromatics), 7.31 (d, 4H, aromatics), 7.62 (d, 4H, aromatics), 7.67 (d, 4H, aromatics), 7.72 (d, 4H, aromatics), 8.10 (s, 4H, aromatics), 8.15 (d, 4H, aromatics).

Benzoic acid [(R)-3-[4-[(4'-cyanobiphenyl-4-yl)oxycarbonyl]phenoxy]-2-methylpropyl]ester, VI. The procedure for the synthesis of II was followed to prepare VI using benzoic acid (0.029 g, 0.24 mmol) instead of 1,3,5-benzenetricarboxylic acid in 78% yield (0.090 g). Anal. Calcd.: C, 75.75%; H, 5.13%; N, 2.85%. Found: C, 75.80%; H, 4.86%; N, 2.79%. $^1$H NMR spectral data (400 MHz, CDCl$_3$): δ (ppm) 1.21 (d, 3H, —CH$_3$), 2.52 (m, 1H, —CH$_2$CH(CH$_3$)CH$_2$—), 4.08 (m, 2H, —CH$_2$OAr), 4.41 (m, 2H, —COOCH$_2$—), 6.99 (d, 2H, aromatics), 7.31 (d, 2H, aromatics), 7.46 (t, 2H, aromatics), 7.60 (t, 1H, aromatics), 7.63 (d, 2H, aromatics), 7.68 (d, 2H, aromatics), 7.73 (d, 2H, aromatics), 8.04 (d, 2H, aromatics), 8.15 (d, 2H, aromatics).

1,3,5-Benzenetricarboxylic acid, 1,3-bis[(R)-3-[4-[(4'-cyanobiphenyl-4-yl)oxycarbonyl]phenoxy]-2-methylpropyl]ester, VII. To a solution of 1,3,5-benzenetricarboxylic acid, 1-tert-butyl ester (0.55 g, 2.1 mmol), Ch$_2$-OH (1.7 g, 4.3 mmol), and TPP (1.2 g, 4.5 mmol) in anhydrous tetrahydrofuran (35 mL), DEADC (0.79 g, 4.5 mmol) was added dropwise. The reaction mixture was stirred under argon at room temperature overnight. The solvent was removed under reduced pressure, and the crude product was purified by gradient column chromatography with 0 to 1% acetone in methylene chloride. The tent-butyl ester was hydrolyzed in anhydrous methylene chloride (33 mL) with 33 mL of trifluoroacetic acid. After stirring under argon at room temperature for 2 h, the reaction mixture was washed with brine before being dried over magnesium sulfate. The solvent was evaporated under reduced pressure, and the crude product was purified by gradient column chromatography on silica gel with 0 to 1% methanol in chloroform. The product was collected by precipitation from a methylene chloride solution into methanol to yield VII (1.7 g, 98%). $^1$H NMR spectral data (400 MHz, CDCl$_3$): δ (ppm) 1.21 (d, 6H, —CH$_3$), 2.56 (m, 2H, —CH$_2$CH(CH$_3$)CH$_2$—), 4.08 (d, 4H, —CH$_2$OAr), 4.47 (m, 4H, —COOCH$_2$—), 6.99 (d, 4H, aromatics), 7.29 (d, 4H, aromatics), 7.60 (d, 4H, aromatics), 7.66 (d, 4H, aromatics), 7.72 (d, 4H, aromatics), 8.14 (d, 4H, aromatics), 8.90 (d, 3H, aromatics).

1,3,5-Benzenetricarboxylic acid, 1,3-bis[(R)-3-[4-[(4'-cyanobiphenyl-4-yl)oxycarbonyl]phenoxy]-2-methylpropyl]ester 5-[3-[4-[(4'-cyanobiphenyl-4-yl)oxycarbonyl]phenoxy]-propyl]ester, VIII. To a solution of VII (0.25 g, 0.26 mmol), 4-(3-hydroxypropoxy)benzoic acid 4'-cyanobiphenyl-4-yl ester (Nm-OH, 0.11 g, 0.29 mmol), and TPP (0.076 g, 0.29 mmol) in anhydrous tetrahydrofuran (7 mL), DEADC (0.050 g, 0.29 mmol) was added dropwise. The reaction solution was stirred under argon at room temperature overnight. The solvent was removed under reduced pressure and the crude product was purified by gradient column chromatography with 0 to 2% acetone in methylene chloride. The product was collected by precipitation from a methylene chloride solution into methanol to yield VIII (0.27 g, 79%). Anal. Calcd.: C, 73.67%; H, 4.71%; N, 3.22%. Found: C, 73.79; H, 4.59; N, 3.22. $^1$H NMR spectral data (400 MHz, CDCl$_3$): δ (ppm) 1.21 (d, 6H, —CH$_3$), 2.34 (quintet, 2H, —CH$_2$CH$_2$CH$_2$—), 2.56 (m, 2H, —CH$_2$CH(CH$_3$)CH$_2$—), 4.07 (d, 4H, —CH$_2$OAr), 4.22 (t, 2H, —CH$_2$OAr), 4.47 (m, 4H, —COOCH$_2$—), 4.62 (t, 2H, —COOCH$_2$—), 6.98 (d, 6H, aromatics), 7.29 (d, 6H, aromatics), 7.62 (d, 6H, aromatics), 7.66 (d, 6H, aromatics), 7.72 (d, 6H, aromatics), 8.14 (d, 6H, aromatics), 8.85 (s, 3H, aromatics).

Poly[[7-[4-(3-Maleimidopropoxy)benzoyloxy]coumarin]-co-[7-[4-[3-[2-norbornene carbonyloxy]propoxy]benzoyloxy]coumarin]], Polymer C. In degassed anhydrous N,N-dimethylformamide (3 mL) were dissolved 6 (0.55 g, 1.3 mmol), 7 (0.6 g, 1.3 mmol), and 2,2-azobisisobutyronitrile (0.014 g, 0.087 mmol). After stirring at 65° C. for 40 h, the reaction mixture was poured into methanol to precipitate Polymer C. The polymer product was further purified by precipitation twice more from chloroform solution into acetone (0.32 g, 28%). The copolymer composition, 6/7=78/22 by mole, was determined by a combination of elemental analysis and $^1$H NMR spectral data. Anal. Calcd.: C, 66.94; H, 4.37; N, 2.55. Found: C, 66.44; H, 4.46; N, 2.36. $^1$H NMR spectral data (400 MHz, CDCl$_3$): δ (ppm) 1.24-3.30 (polymer backbone and —CH$_2$CH$_2$CH$_2$—), 3.42-4.19 (—COOCH$_2$— and —CH$_2$OAr—), 6.36 (—HC═CHCO—, coumarin), 6.69-7.10 (aromatics and coumarin), 7.46 (coumarin), 7.66 (—HC═CHCO—, coumarin), 8.00 (aromatics).

(S)-4-(3-Hydroxy-2-methylpropoxy)-4'-cyanobiphenyl, Ch$_1$-OH. To a mixture of 4'-cyano-4-hydroxybiphenyl (1.5 g, 7.7 mmol), potassium carbonate (1.6 g, 12 mmol), and potassium iodide (0.13 g, 0.77 mmol) in acetonitrile (30 mL) was added (S)-3-bromo-2-methylpropanol (1.4 g, 9.2 mmol) dropwise. The reaction mixture was refluxed overnight before cooling and quenching with water. The resultant mixture was extracted with methylene chloride (2×100 mL) and washed with 1 M aqueous hydrochloric acid and brine. The combined organic portions were dried over magnesium sulfate and evaporated to dryness. The crude solid was purified by gradient column chromatography on silica gel with 0 to 4% acetone in methylene chloride and then recrystallized from methanol to yield Ch$_1$-OH (0.90 g, 44%). $^1$H NMR spectral data (400 MHz, CDCl$_3$): δ (ppm) 1.09 (d, 3H, —CH$_3$), 2.25 (m, 1H, —CH$_2$CH(CH$_3$)CH$_2$—), 3.75 (d, 2H, HOCH$_2$—), 4.03 (d, 2H, —CH$_2$OAr), 7.03 (d, 2H, aromatics), 7.55 (d, 2H, aromatics), 7.66 (d, 2H, aromatics), 7.71 (d, 2H, aromatics).

(S)-4-(3-Hydroxy-2-methylpropoxy)benzoic acid, 1. Acetonitrile (70 ml) was added to a mixture of 4-hydroxybenzoic acid methyl ester (5.0 g, 46 mmol), (S)-3-bromo-2-methylpropanol (7.7 g, 55 mmol), potassium carbonate (9.5 g, 69 mmol), and a catalytic amount of potassium iodide. After refluxing overnight, the solid residue was removed from the reaction mixture by filtration, and the filtrate was evaporated to dryness under reduced pressure. To a solution of the resultant solid in ethanol (250 mL), potassium hydroxide (22 g, 390 mmol) was added, and the reaction mixture was refluxed for 2 h. After evaporating off solvent under reduced pressure, the solid residue was dissolved in water and acidified with 1 M aqueous hydrochloric acid. The crude product was collected by filtration and washed with water. Recrystallization with chloroform yielded 1 (5.6 g, 68%). $^1$H NMR spectral data (400 MHz, DMSO-d$_6$): δ (ppm) 0.96 (d, 3H, —CH$_3$), 2.01 (m, 1H, —CH$_2$CH(CH$_3$)CH$_2$—), 3.42 (s, 2H, HOCH$_2$—), 4.00 (m, 2H, —CH$_2$OAr), 4.60 (s, 1H, HO—), 7.02 (d, 2H, aromatics), 7.89 (d, 2H, aromatics), 12.6 (s, 1H, —COOH).

(R)-4-[3-[(tent-Butyldimethylsilyl)oxy]-2-methylpropoxy] benzoic acid, 2. In anhydrous N,N-dimethylformamide (30 mL) were dissolved 1 (5.4 g, 26 mmol) and tert-butyldimethylsilyl chloride (TBDMSCl) (8.5 g, 57 mmol). To the resultant solution, imidazole (7.0 g, 100 mmol) was quickly added. After stirring under argon at room temperature overnight, the reaction mixture was extracted with diethyl ether. An oily liquid emerged from evaporating off ether under reduced pressure. The oil was dissolved in methanol (120 mL) and tetrahydrofuran (40 mL), followed by stirring with a solution of potassium carbonate (4.2 g, 30 mmol) in water (42 mL) for 1 h. The volume of the solution was reduced by 75% via evaporation under reduced pressure. The pH of the solution was adjusted to 5.0 with 1 M aqueous hydrochloric acid. The solid product was collected by filtration and washed with water several times to yield 2 (6.8 g, 82%). $^1$H NMR spectral data (400 MHz, DMSO-d$_6$): δ (ppm) 0.03 (s, 6H, —Si(CH$_3$)$_2$O—), 0.87 (s, 9H, —SiC(CH$_3$)$_3$), 0.97 (d, 3H, —CH$_3$), 2.03 (m, 1H, —CH$_2$CH(CH$_3$)CH$_2$—), 3.52 (d, 2H, —SiOCH$_2$—), 3.92 (m, 2H, —CH$_2$OAr), 7.02 (d, 2H, aromatics), 7.89 (d, 2H, aromatics), 12.6 (s, 1H, —COOH).

(R)-4-[3-[(tent-Butyldimethylsilyl)oxy]-2-methylpropoxy] benzoic acid 4'-cyano-biphenyl-4-yl ester, 3. 4'-cyano-4-hydroxybiphenyl (2.2 g, 12 mmol), 2 (3.5 g, 11 mmol), and p-toluenesulfonic acid/4-(dimethylamino)pyridine complex (DPTS) (0.32 g, 1.1 mmol) were dissolved in a mixture of anhydrous chloroform (45 mL) and anhydrous N,N-dimethylformamide (5.0 mL). N,N-dicyclohexylcarbodiimide (DCC) (2.7 g, 13 mmol) was quickly added to the reaction mixture, which was stirred under argon at room temperature overnight. Upon filtering off white solids, the filtrate was diluted with additional chloroform. The solution was washed with 1 M hydrochloric acid and brine before being dried over magnesium sulfate. The crude product was collected by evaporation under reduced pressure and purified by gradient column chromatography on silica gel with methylene chloride:hexanes from 5:1 to 100:1 (v/v) as the eluent to yield 3 (5.0 g, 93%). $^1$H NMR spectral data (400 MHz, CDCl$_3$): δ (ppm) 0.03 (s, 6H, —Si(CH$_3$)$_2$O—), 0.88 (s, 9H, —SiC(CH$_3$)$_3$), 1.04 (d, 3H, —CH$_3$), 2.15 (m, 1H, —CH$_2$CH(CH$_3$)CH$_2$—), 3.64 (m, 2H, —SiOCH$_2$—), 4.01 (m, 2H, —CH$_2$OAr), 6.99 (d, 2H, aromatics), 7.32 (d, 2H, aromatics), 7.51 (d, 2H, aromatics), 7.62 (d, 2H, aromatics), 7.72 (d, 2H, aromatics), 8.15 (d, 2H, aromatics).

(S)-4-(3-Hydroxy-2-methylpropoxy)benzoic acid 4'-cyanobiphenyl-4-yl ester, Ch$_2$-OH. Intermediate 3 (5.0 g, 10.0 mmol) was hydrolyzed in a mixture of acetic acid, tetrahydrofuran, and water (3:1:1 by volume) at 40° C. for 1 h. The reaction mixture was extracted with methylene chloride and washed with water several times. The organic portion was treated with 10% sodium hydrogen carbonate and brine before being dried over anhydrous magnesium sulfate. Upon evaporating off methylene chloride under reduced pressure, the solid residue was purified by gradient column chromatography on silica gel with 0 to 2% acetone in methylene chloride as the eluent to afford Ch$_2$-OH (3.6 g, 94%). $^1$H NMR spectral data (400 MHz, CDCl$_3$): δ (ppm) 1.07 (d, 3H, —CH$_3$), 1.63 (t, 1H, HO—), 2.23 (m, 1H, —CH$_2$CH(CH$_3$)CH$_2$—), 3.73 (m, 2H, HOCH$_2$—), 4.05 (m, 2H, —CH$_2$OAr), 6.99 (d, 2H, aromatics), 7.32 (d, 2H, aromatics), 7.51 (d, 2H, aromatics), 7.62 (d, 2H, aromatics), 7.72 (d, 2H, aromatics), 8.15 (d, 2H, aromatics).

3,6-oxo-Δ$^4$-tetrahydrophthalimide, 4. Maleimide (5.0 g, 51 mmol) and furan (20 mL, 310 mmol) were dissolved in ethyl acetate (40 mL). The reaction solution was stirred for 3 days at room temperature. The product was collected by filtration to yield a mixture of endo and exo products, 4. (7.7 g, 90%) $^1$H NMR spectral data (400 MHz, CDCl$_3$): δ (ppm) endo product: 3.59 (s, 2H, —COCHCHCO—), 5.33 (s, 2H, —CHOCH—), 6.54 (s, 2H, —CH═CH—); exo product: 2.91 (s, 2H, —COCHCHCO—), 5.33 (s, 2H, —CHOCH—), 6.54 (s, 2H, —CH═CH—); endo:exo=1.7:1.0.

7-[4-[3-(3,6-oxo-Δ$^4$-tetrahydrophthalimido)propoxy]benzoyloxy]coumarin, 5. DEADC (0.49 g, 2.8 mmol) was added dropwise at −78° C. to a solution of 7-[(3-hydroxypropoxy)-benzoyloxy]coumarin (1.0 g, 2.9 mmol), 4 (0.46 g, 0.28 mmol), and TPP (0.74 g, 2.8 mmol) in anhydrous THF (15 mL). The reaction was warmed up to room temperature and stirred under argon overnight. The solvent was then removed under reduced pressure, and the solid residue was purified by gradient column chromatography on silica gel with 0 to 1% acetone in methylene chloride. The product was collected by precipitation from a methylene chloride solution into methanol to yield a mixture of endo and exo products, 5 (0.97 g, 71%). $^1$H NMR spectral data (400 MHz, CDCl$_3$): δ (ppm) endo product: 1.99 (quintet, 2H, —NCH$_2$CH$_2$CH$_2$O—), 3.57 (m, 4H, —COCHCHCO—, —NCH$_2$CH$_2$CH$_2$O—), 4.01 (t, 2H, —NCH$_2$CH$_2$CH$_2$O—), 5.33 (s, 2H, —CHOCH—), 6.40 (s, 1H, —HC═CHCO—, coumarin), 6.42 (s, 2H, —CH═CH—), 6.97 (d, 2H, aromatics), 7.17 (d, 1H, coumarin), 7.23 (s, 1H, coumarin), 7.52 (d, 1H, coumarin), 7.71 (d, 1H, —HC═CHCO—, coumarin), 8.14 (d, 2H, aromatics); exo product: 2.12 (quintet, 2H, —NCH$_2$CH$_2$CH$_2$O—), 2.84 (s, 2H, —COCHCHCO—), 3.72 (t, 2H, —NCH$_2$CH$_2$CH$_2$O—), 4.08 (t, —NCH$_2$CH$_2$CH$_2$O—), 5.24 (s, 2H, —CHOCH—), 6.40 (d, 1H, —HC═CHCO—, coumarin), 6.51 (s, 2H, —CH═CH—), 6.97 (d, 2H, aromatics), 7.17 (d, 1H, coumarin), 7.23 (s, 1H, coumarin), 7.52 (d, 1H, coumarin), 7.71 (d, 1H, —HC═CHCO—, coumarin), 8.14 (d, 2H, aromatics); endo:exo=2.6:1.0.

7-[4-(3-Maleimidopropoxy)benzoyloxy]coumarin, 6. A solution of 5 (1.5 g, 3.1 mmol) in toluene (50 mL) was refluxed for 20 hours to remove the furan-protecting group followed by evaporating off solvent under reduced pressure. The product was collected by precipitation from a methylene chloride solution into methanol to yield 6 (1.3 g, 100%). $^1$H NMR spectral data (400 MHz, CDCl$_3$): δ (ppm) 2.14 (quintet, 2H, —NCH$_2$CH$_2$CH$_2$O—), 3.77 (t, 2H, —NCH$_2$CH$_2$CH$_2$O—), 4.07 (t, —NCH$_2$CH$_2$CH$_2$O—), 6.42 (d, 1H, —HC═CHCO—, coumarin), 6.71 (s, 2H, —CH═CH—), 6.95 (d, 2H, aromatics), 7.17 (d, 1H, coumarin), 7.23 (s, 1H, coumarin), 7.52 (d, 1H, coumarin), 7.71 (d, 1H, —HC═CHCO—, coumarin), 8.12 (d, 2H, aromatics).

7-[4-[3-(5-Norbornene-2-carbonyloxy)propoxy]benzoyloxy]coumarin, 7. To a solution of 7-[(3-hydroxypropoxy) benzoyloxy]coumarin (1.0 g, 2.9 mmol), 5-norbornene-2-carboxylic acid (0.39 g, 0.28 mmol), and TPP (0.81 g, 3.0 mmol) in anhydrous THF (30 mL), DEADC (0.54 g, 3.0 mmol) was added dropwise. The reaction was stirred under argon at room temperature overnight. The solvent was then removed under reduced pressure, and the solid residue was purified by gradient column chromatography on silica gel with 0 to 1% acetone in methylene chloride. The product was collected by recrystallization from ethanol to afford 7 (1.1 g, 85%). $^1$H NMR spectral data (400 MHz, CDCl$_3$) δ (ppm) endo product: 1.35-3.20 (m, 9H, norbornene and —CH$_2$CH$_2$CH$_2$—), 4.14 (t, 2H, —CH$_2$OAr—), 4.24 (t, 2H, —COOCH$_2$—), 5.88 (s, 1H, CH═), 6.18 (s, 1H, CH═), 6.41 (d, 1H, —HC═CHCO—, coumarin), 7.00 (d, 2H, aromatics), 7.16 (d, 1H, coumarin), 7.23 (s, 1H, coumarin), 7.52 (d, 1H, coumarin), 7.71 (d, 1H, —HC═CHCO—, coumarin), 8.14 (d, 2H, aromatics); exo product: 1.35-3.20 (m, 9H, norbornene and —CH$_2$CH$_2$CH$_2$—), 4.16 (t, 2H, —CH$_2$OAr—), 4.31 (t, 2H, —COOCH$_2$—), 6.10 (s, 1H, CH═), 6.14 (s, 1H, CH═), 6.41 (d, 1H, —HC═CHCO—, coumarin), 7.00 (d, 2H, aromatics), 7.16 (d, 1H, coumarin), 7.23 (s, 1H, coumarin), 7.52 (d, 1H, coumarin), 7.71 (d, 1H, —HC═CHCO—, coumarin), 8.14 (d, 2H, aromatics); endo:exo=3.2:1.0.

Molecular Structures and Thermotropic Properties.

Molecular structures were elucidated with $^1$H NMR spectroscopy in CDCl$_3$ or DMSO-d$_6$ (Avance-400, 400 MHz) and elemental analysis (Quantitative Technologies, Inc.). Thermal transition temperatures were determined by differential scanning calorimetry (DSC, Perkin-Elmer DSC-7) with a continuous N$_2$ purge at 20 mL/min. Samples were preheated to the to the isotropic state followed by cooling at −20° C./min to −30° C., furnishing the reported second heating and cooling scans. Liquid crystalline mesomorphism was characterized by hot stage polarizing optical microscopy (DMLM, Leica, FP90 central processor and FP82 hot stage, Mettler, Toledo).

Mechanical Alignment of Glassy GLC Films on Rubbed Polyimide Coatings.

Optically flat fused-silica substrates (25.4 mm diameter×3 mm thickness, Esco Products; n=1.459 at 589.0 nm) were spin-coated with a polyimide alignment layer (Nissan SUN-EVER) and uniaxially rubbed. Cholesteric GLC films of II through IV and VIII were prepared between two surface-treated substrates with the film thickness defined by glass fiber spacers (EM Industries, Inc.). Upon melting a powdered cholesteric GLC sample, the fluid film was cooled to 0.77 T$_c$, where shearing was applied to induce alignment, followed by annealing for 0.5 hours. The films were then cooled at −10° C./h to 0.74 T$_c$, where additional annealing was performed for 3 h before quenching to room temperature. Transmittance at normal incidence and reflection at 6° off normal were measured with unpolarized incident light using a UV-vis-NIR spectrophotometer (Lambda-900, Perkin Elmer equipped with a beam depolarizer). Fresnel reflections from the air-glass interfaces were accounted for with a reference cell containing an index-matching fluid (n=1.500 at 589.6 nm) between two surface-treated fused silica substrates. A combination of a linear polarizer (HNP'B, Polaroid) and zero-order quarter waveplate (AO15Z1/4-425, Tower Optical Corporation. or NQM-100-738, Meadowlark Optics., respectively) was employed to produce left- or right-handed circularly polarized light.

Photo-Alignment of Cholesteric GLC Films.

Films of Polymers A, B, and C were deposited on optically flat fused-silica substrates transparent to 200 nm (Esco Products) by spin coating from 0.1 wt % chloroform solutions. Linearly polarized irradiation was performed under argon using a 500 W Hg—Xe lamp (model 66142, Oriel) equipped with a dichroic mirror that reflects the light between 260 and 320 nm (model 66217, Oriel), a filter (model 87031, Oriel) that cuts off wavelengths below 300 nm, and a polarizing beam splitter (HPB-308 nm, Lambda Research Optics, Inc.). Polymers A, B, and C films were irradiated at 120, 160, and 196° C., respectively, corresponding to 1.15 of their respective T$_g$s. The irradiation intensity was monitored by a UVX digital radiometer coupled with a UVX-31 sensor (UVP, Inc.). The resultant films were characterized with variable angle spectroscopic ellipsometry (V-Vase, J. A. Woollam Corporation) for film thickness and with UV-Vis-NIR spectrophotometry (Lambda-900, Perkin-Elmer) for the extent of coumarin dimerization. The insolubility of irradiated films was tested by UV-Vis absorbance after rinsing with chloroform. Cholesteric GLC films of III were prepared between photo-alignment coatings with the same thermal treatment as described above for mechanical alignment.

Results

Figure 7:
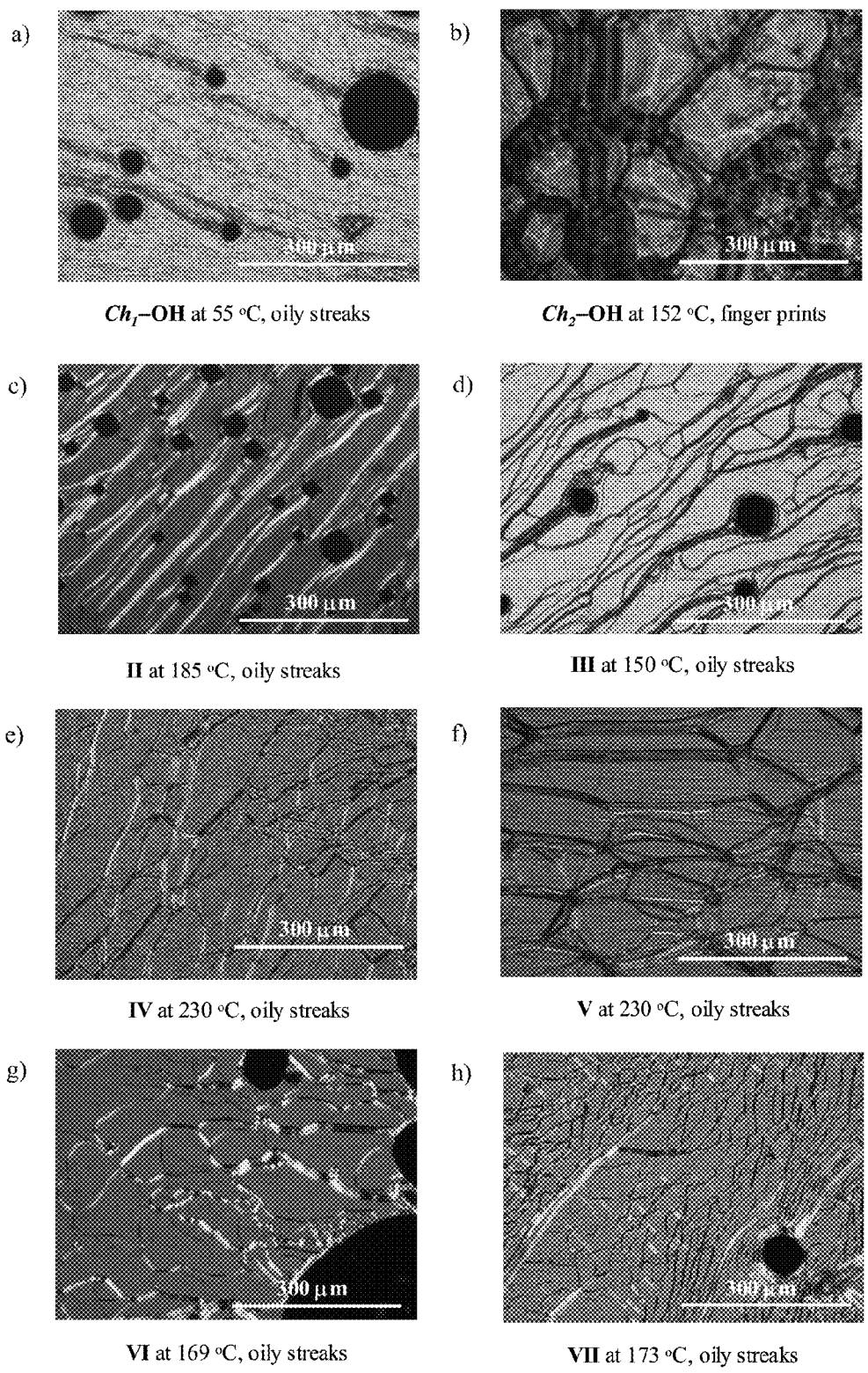
FIG. 7. Polarizing optical micrographs of samples sandwiched between an untreated microscope glass slide and a cover slip for identification of cholesteric mesomorphism by oily streaks or finger prints. (a) $Ch_1$-OH at 55° C., oily streaks; (b) $Ch_2$-OH at 152° C., finger prints; (c) II at 185° C., oily streaks; (d) III at 150° C., oily streaks; (e) IV at 230° C., oily streaks; (f) V at 230° C., oily streaks; (g) VI at 169° C., oily streaks; (h) VII at 173° C., oily streaks; and (i) VIII at 174° C., oily streaks.
Figure 7:
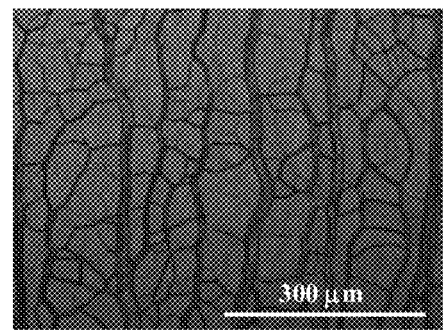

All the compounds synthesized for this study as shown in Chart 1 were synthesized following Reaction Scheme 1. To afford hybrid chiral-nematic molecules for the construction of cholesteric GLCs, Ch$_1$-OH and Ch$_2$-OH were synthesized and characterized as cholesteric liquid crystals. With a more extended rigid rod, Ch$_2$-OH exhibits a much wider liquid crystalline temperature range than Ch$_1$-OH, as indicated by the DSC thermograms compiled in FIG. 1a, but both Ch$_1$-OH and Ch$_2$-OH are prone to crystallization on heating and cooling. The cholesteric mesophase temperature ranges for all the thermograms in FIG. 1a were identified by the oily streaks or finger prints observed in situ under polarizing optical microscopy, as shown in FIG. 7. The tendency of a liquid crystal to crystallize can be overcome by chemical bonding to a volume-excluding core. Compounds I and II represent 1,3,5-trisubstitution on a benzene core. While both Ch$_1$-OH and Ch$_2$-OH are morphologically unstable cholesteric liquid crystals, I is an amorphous solid with a T$_g$ at 63° C., and II is a morphologically stable cholesteric GLC with a T$_g$ at 73° C. and a T$_c$ at 295° C. The morphologies of Compounds I and II suggest that the hierarchy in molecular order is lowered by attaching Ch$_1$-OH and Ch$_2$-OH to a benzene core.

Compounds III, IV, V, and VI serve to elucidate how the number of hybrid chiral-nematic pendants and regioisomerism affect solid morphology, phase transition temperatures, and selective reflection property. The DSC thermograms shown in FIG. 1a indicate that with ortho- and meta-isomers on a benzene core, III and IV form morphologically stable cholesteric GLCs with the same T$_g$, while IV exhibits a T$_c$ about 20° C. higher than that of III. In contrast, para-disubstitution and monosubstitution, as in V and VI, result in cholesteric liquid crystals that crystallize on heating and cooling without evidence of glass transition. Nevertheless, para-disubstitution is responsible for the highest T$_c$ of all with monosubstitution lagging behind all others by 60 to 120° C.

Compounds with both hybrid chiral-nematic pendants and nematic pendants were prepared. Compounds VIII and its precursor VII, were both found to be morphologically stable cholesteric GLCs. Because of intermolecular hydrogen bonding involving carboxylic acid groups, Compound VII shows a T$_g$ 35° C. higher than IV but with little difference in T$_c$ between the two. For the same 1,3,5-trisubstitution on a benzene core, VIII exhibits about 20° C. elevation in T$_c$ over II with no difference in T$_g$ between the two. A comparison of the phase transition temperatures of all morphologically stable glassy liquid crystals leads to a conclusion that both T$_g$ and T$_c$ increase with the number of hybrid chiral-nematic mesogens to a single benzene core.

Chart 1.
Molecular structures of all the cholesteric liquid crystals synthesized for this study with their phase transition temperatures expressed in °C. as determined by DSC thermograms. Heating and cooling scans are reported as first and second line, respectively, and the only the heating scans are reported for morphologically stable compounds.
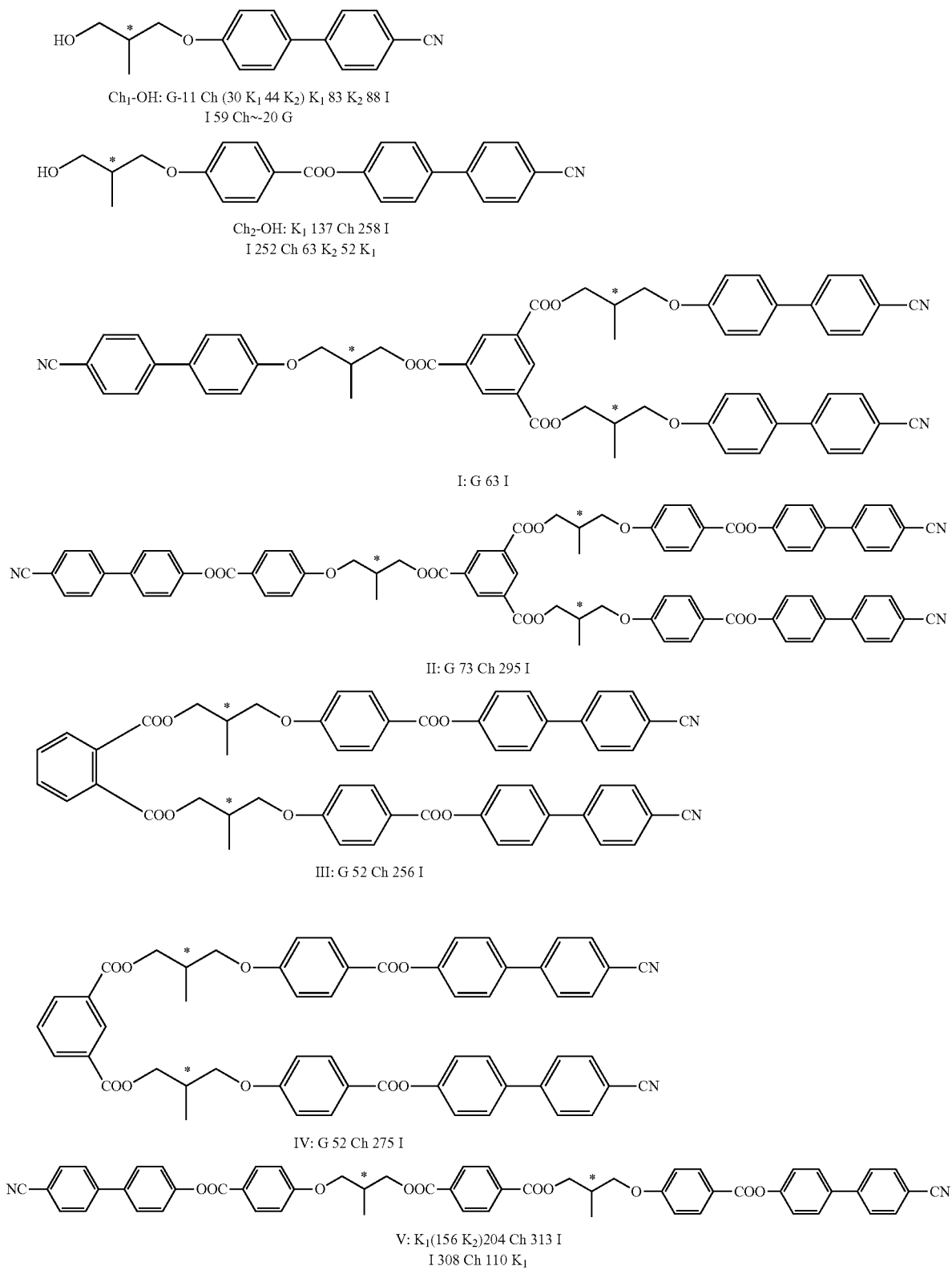

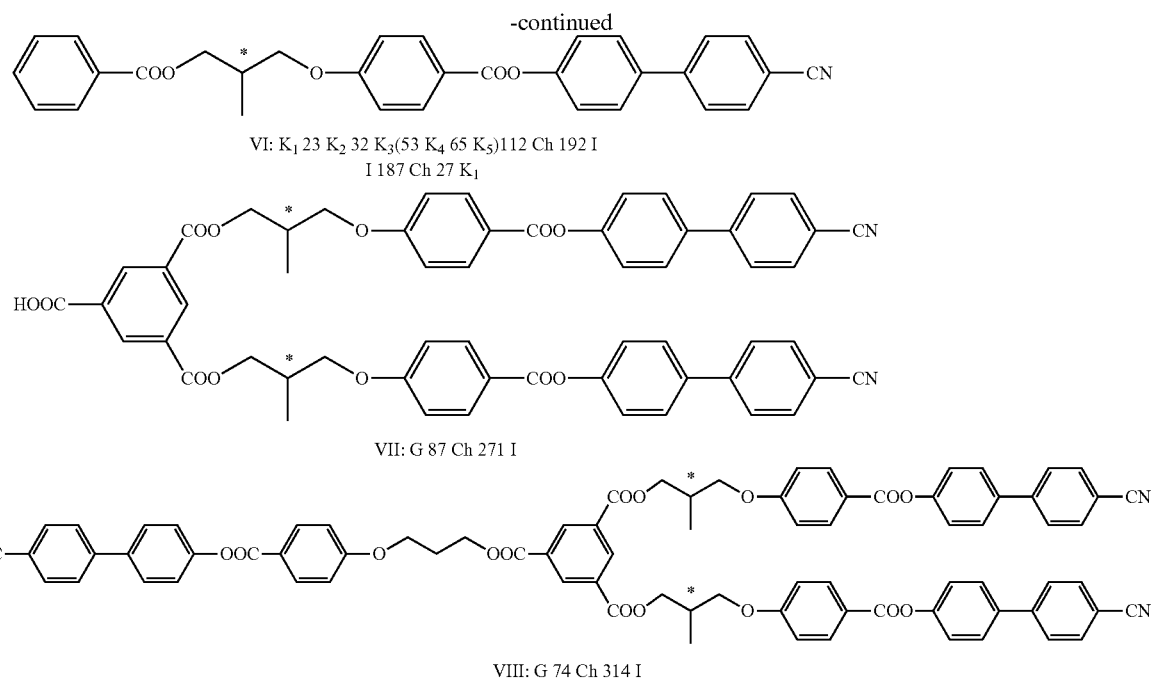
VI: $K_1$ 23 $K_2$ 32 $K_3$(53 $K_4$ 65 $K_5$)112 Ch 192 I
I 187 Ch 27 $K_1$
VII: G 87 Ch 271 I
VIII: G 74 Ch 314 I
Symbols: G, glassy; K, crystalline; Ch, cholesteric; I, isotropic.
Reaction Scheme 1. Synthesis of $Ch_1$-OH, $Ch_2$-OH, and I through VIII without altering stereochemistry at asymmetric carbon center inherited from (S)-3-bromo-2-methylpropanol.
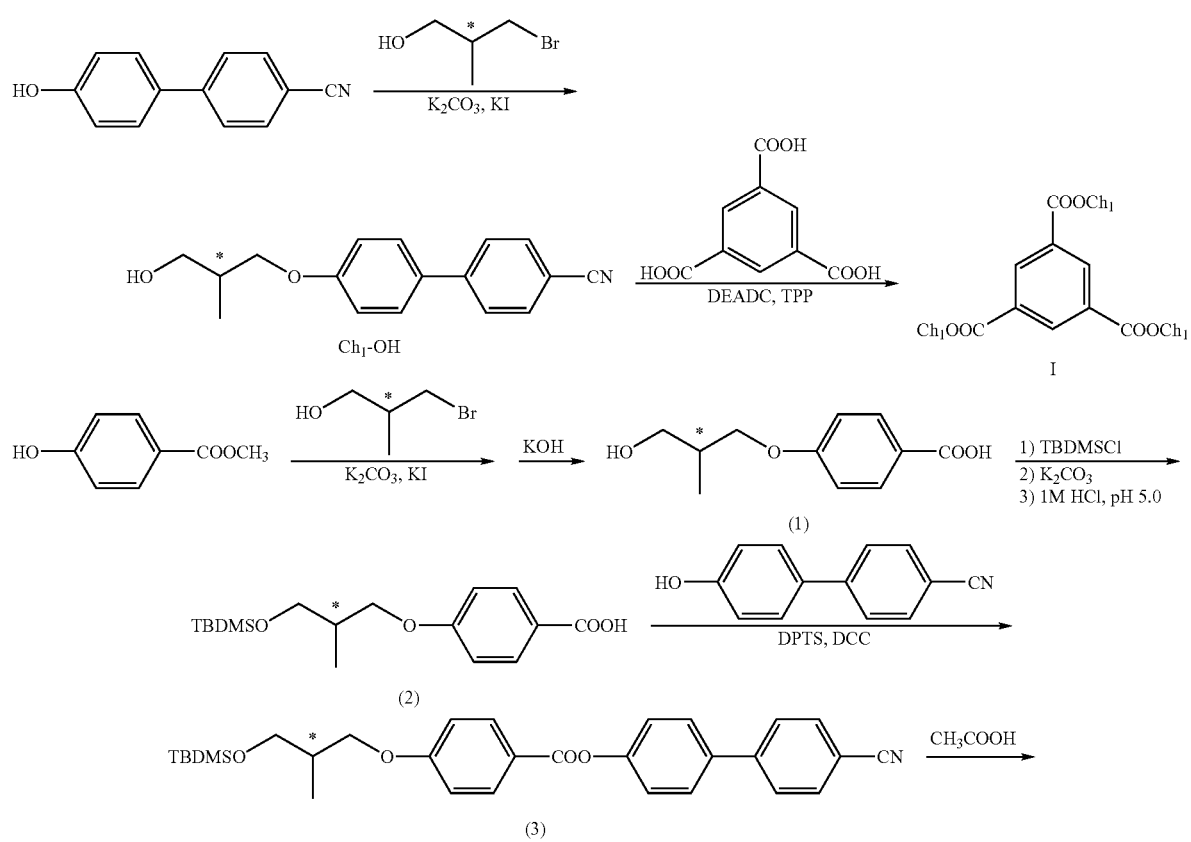

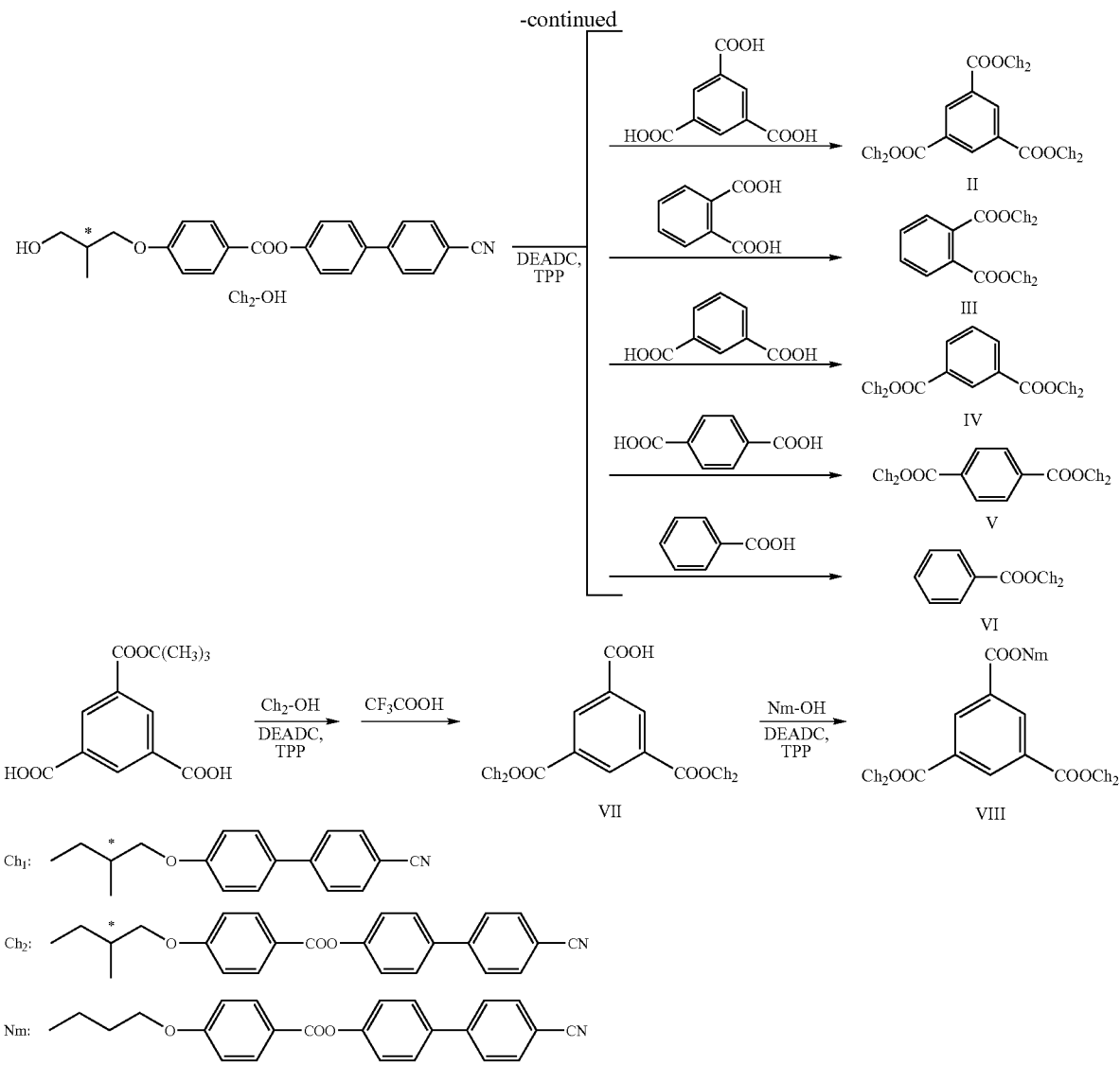

Figure 2:
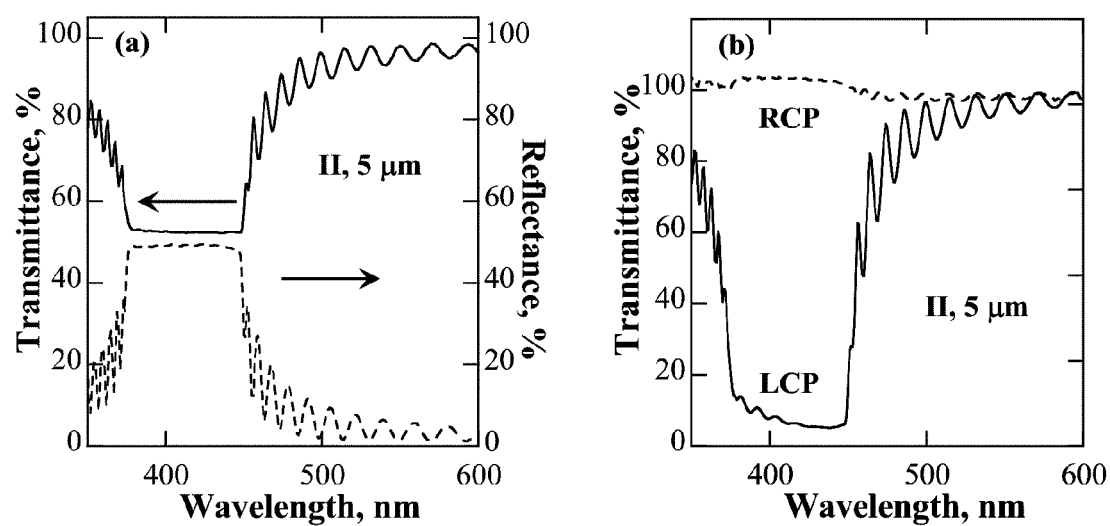
FIG. 2. (a) Transmission and reflection spectra with unpolarized incident light and (b) circularly polarized transmission spectra of a 5 μm-thick cholesteric GLC film of II between rubbed polyimide films.

To characterize the selective wavelength reflection property of cholesteric liquid crystals, monodomain cholesteric GLC films were prepared between rubbed polyimide films for the measurement of transmittance and reflectance. The results are illustrated in FIG. 2a with a 5-μm-thick film of II, showing a selective reflection band centering at $\lambda_R$=413 nm. FIG. 2b presents the transmission of right-handed circularly polarized light and the reflection of the left-handed counterpart, indicating a left-handed helical stack of quasi-nematic layers with (S)-3-bromo-2-methylpropanol as the chiral precursor.

With (S)-3-bromo-2-methylpropanol as the chiral building block, left handedness was identified for films prepared with all the compounds reported herein. A right-handed helical stack is expected of (R)-3-bromo-2-methylpropanol as the chiral precursor with the same $\lambda_R$. A mixture of these two enantiomeric cholesteric GLCs at varying ratios will generate films with $\lambda_R$ ranging continuously from blue, through the visible to infrared region, ultimately reaching an infinite $\lambda_R$ with an equimolar mixture.

Figure 3:
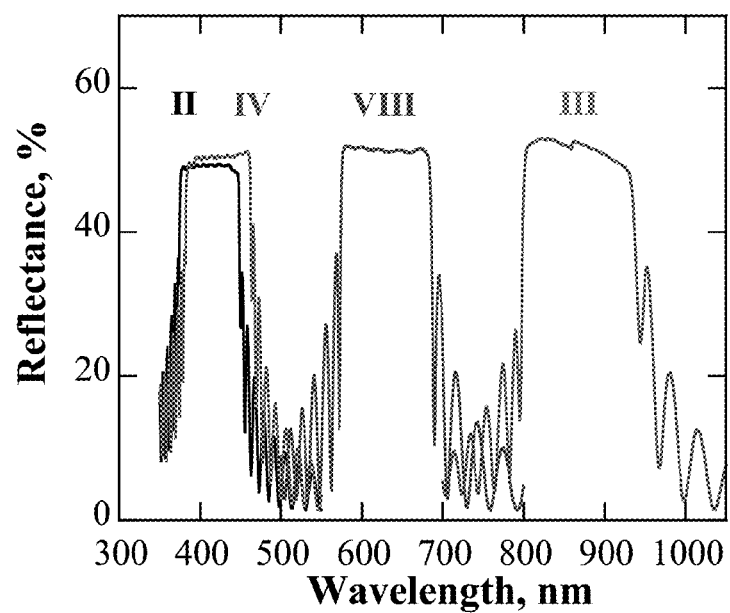
FIG. 3. Reflection spectra of cholesteric GLC films of II, III, IV, and VIII with unpolarized incident light.

The selective reflection spectra of 5-μm-thick morphologically stable cholesteric GLC films II, III, IV, and VIII are presented in FIG. 3. With the hybrid chiral-nematic mesogens on a benzene core at 1,3,5- and 1,3-positions, respectively, cholesteric GLC films of II and IV have nearly the same selective reflection wavelength, $\lambda_R$, at 413 versus 422 nm. In contrast, the cholesteric GLC film of III with a 1,2-disubstitution has a much longer $\lambda_R$ at 860 nm. With two hybrid chiral-nematic mesogens and one nematic mesogen to a benzene core, the cholesteric GLC film of VIII has its $\lambda_R$ at 630 nm, which is still shorter than III despite the dilution by a non-chiral nematogen per molecule, further evidence that regioisomerism plays an important role in selective reflection property despite the dilution by a nematic mesogen compared to III.

Figure 4:
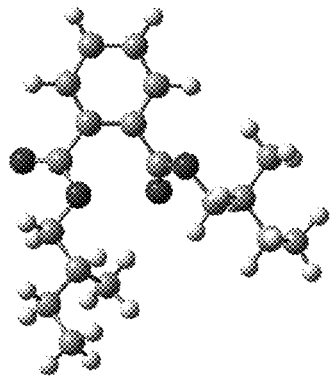
FIG. 4. Computed structures of the moieties from benzene core to chiral spacers for III, (a) and (b) with ortho-disubstitution; and for IV, (c) and (d) with meta-disubstitution.
Figure 4:
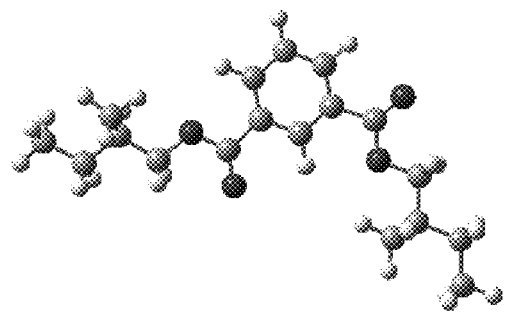
Figure 4:
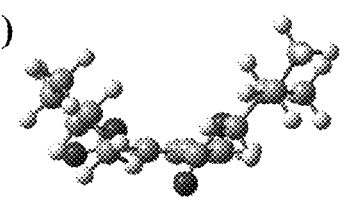
Figure 4:
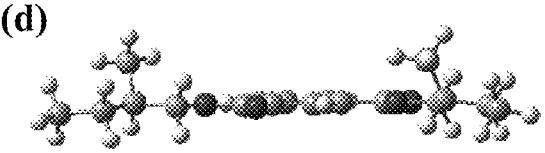

Molecular packing involving chiral moieties was recognized as an origin of the difference in helical twisting and hence $\lambda_R$. The Gaussian 2003 software package was employed to compute molecular geometries using B3LYP functionals with the 6-31G(d) basis set. Because of the number of atoms involved, computations were limited to single molecules. Instead of the entire molecules of III and IV, the portions from the benzene core to chiral spacers were computed since the rest of the rigid pendants are linear, viz. irrelevant to the depiction of molecular packing in relation to helical twisting. Limiting the number of atoms per molecule is also advantageous to computation time and accuracy. FIGS. 4a and b reveal the top- and side-views of the ortho-isomer, and 4c and d those of the meta-isomer, respectively. It is evident that oxygen atoms are twisted out of plane defined by the benzene core in the ortho-isomer because of steric hindrance. The non-planar geometry restricts the two chiral moieties to acting independently. In contrast, the meta-isomer has a rather planar geometry, permitting the two chiral moieties to act in unison. This difference in molecular geometry and the resulting packing behavior seems to be responsible for the shorter $\lambda_R$ in the meta-isomer than the ortho-isomer. Following this line of argument, cholesteric GLC films of II and IV should have comparable $\lambda_R$ values, as borne out in FIG. 3.

Traditionally, cholesteric liquid crystalline films are oriented on rubbed polyimide films to yield both reflectance and transmittance approaching the theoretical limit of 50%. Although coumarin-containing polymer films are capable of photo-alignment of a nematic fluid (i.e., E-7) and glassy-nematic oligofluorene films, the orientation of helically stacked cholesteric glassy liquid crystalline films have not been attempted thus far. Compound III was used here to test the amenability of cholesteric GLCs of the present invention to photo-alignment on films of Polymers A, B, and C as depicted in Chart 2. Polymers A and B had been synthesized and characterized previously, and Polymer C was synthesized following Reaction Scheme 2.

Polymer C has a higher $T_g$ than Polymers A and B, 135 versus 102 and 68° C., respectively. Spin-cast films of Polymers A, B, and C were irradiated with linearly polarized light at 300-320 nm to effect coumarin dimerization preferentially along the polarization axis of irradiation. Polarized UV-irradiation was conducted at 1.15 $T_g$ with a fluence of 0.2 J/cm² for Polymer A and 0.5 J/cm² for Polymers B and C. The extents of coumarin dimerization, X, were determined by UV-Vis absorption spectroscopy at 0.24, 0.24, and 0.27 for Polymers A, B, and C, respectively, sufficient to ensure film insolubility in chloroform. Pairs of fused silica substrates with the resultant UV-irradiated polymer films and rubbed polyimide films were used to prepare 7-μm-thick cholesteric GLC films of III via thermal annealing with subsequent cooling to room temperature.

Figure 5:
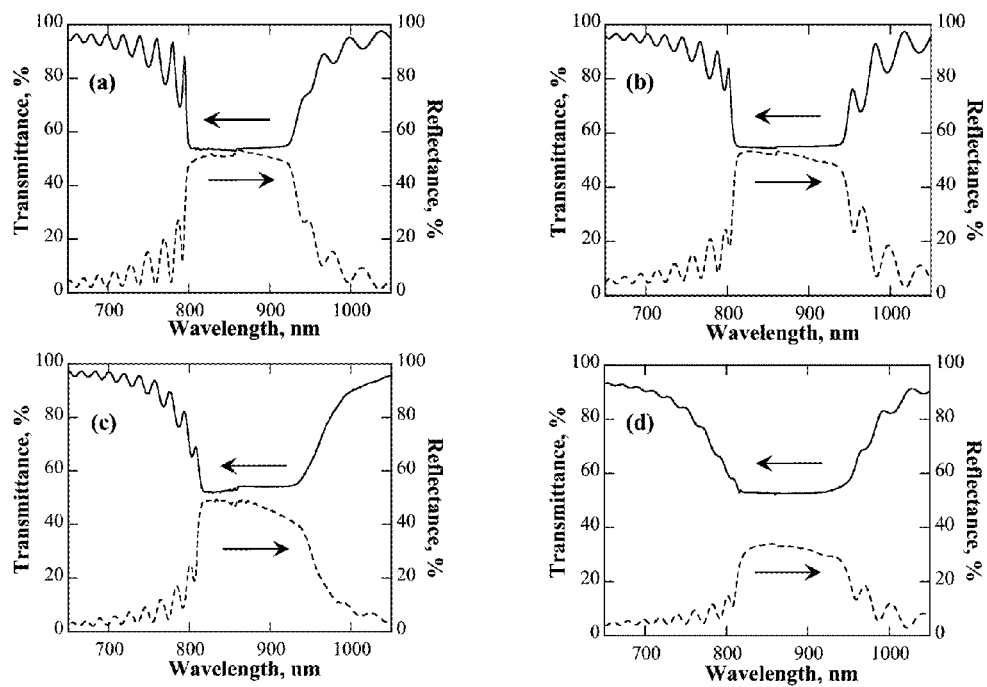
FIG. 5. Transmission and reflection spectra of cholesteric GLC film of 7-μm-thick films of III sandwiched between (a) rubbed polyimide films; (b) Polymer A films irradiated with 0.2 J/cm$^2$ at 120° C. to X=0.24; (c) Polymer B films irradiated with 0.5 J/cm$^2$ at 160° C. to X=0.24; and (d) Polymer C films irradiated with 0.5 J/cm$^2$ at 196° C. to X=0.27.

As shown in FIGS. 5a and b, the transmission and selective reflection spectra of a 7-μm-thick film of III sandwiched between photo-alignment films prepared with Polymer A are close to those for a film between uniaxially rubbed polyimide films, the traditional approach to liquid crystal orientation. Polymer B is slightly inferior in their ability to orient III than Polymer A due to the shorter flexible spacer to the same methacrylate backbone, FIG. 5c compared to 5b. Because of the more rigid and bulky backbone with a propylene spacer to coumarin monomers, Polymer C films fall short of their capability for photo-alignment in comparison to Polymers A and B; see FIG. 5d versus FIGS. 5b and c.

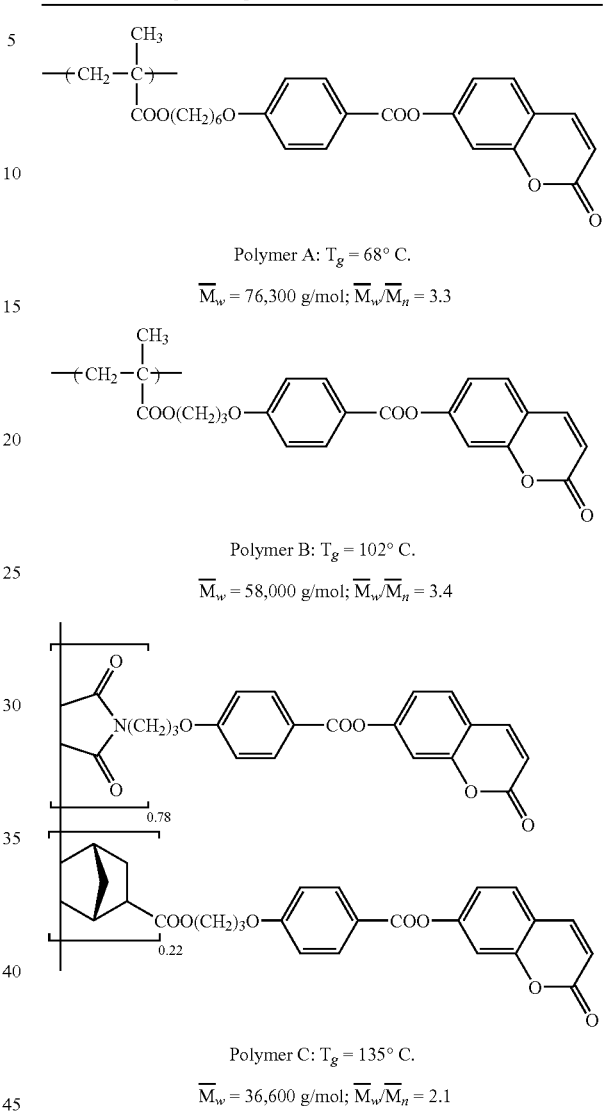

Chart 2. Chemical structures of coumarin-containing Polymers A, B, and C for photo-alignment of cholesteric GLC films.

Polymer A: $T_g$ = 68° C.
$\overline{M}_w$ = 76,300 g/mol; $\overline{M}_w/\overline{M}_n$ = 3.3

Polymer B: $T_g$ = 102° C.
$\overline{M}_w$ = 58,000 g/mol; $\overline{M}_w/\overline{M}_n$ = 3.4

Polymer C: $T_g$ = 135° C.
$\overline{M}_w$ = 36,600 g/mol; $\overline{M}_w/\overline{M}_n$ = 2.1

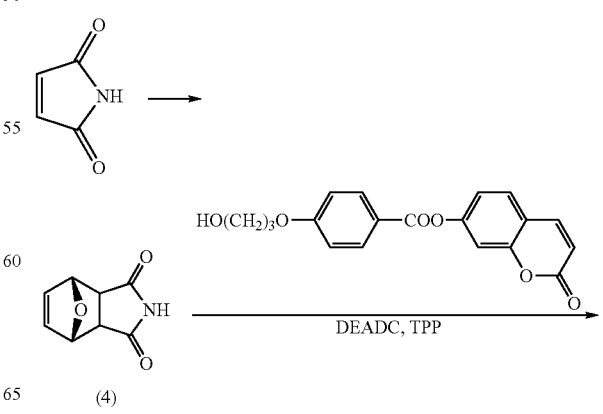

Reaction Scheme 2. Synthesis of coumarin-containing Polymer C

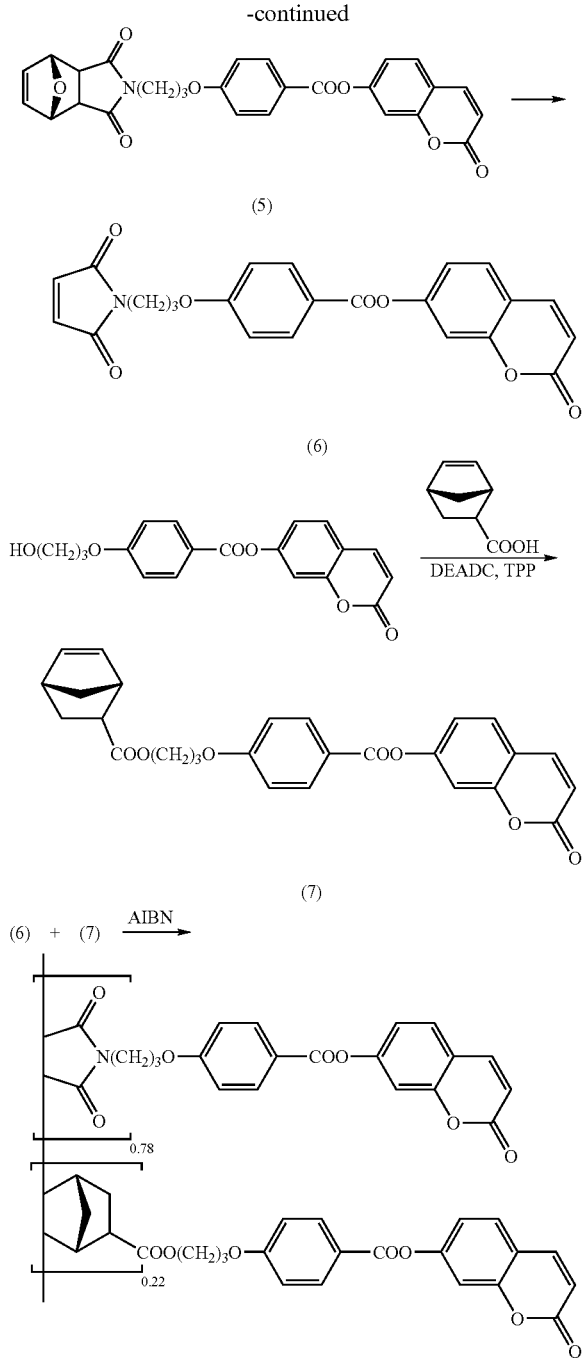

may scatter incident light, causing the shallow edges of the transmission spectrum shown in FIG. 5d.

Irradiation of the coumarin-containing polymer films of Polymers A, B, and C at the same temperatures relative to their respective $T_g$s permits a sensible comparison of their photo-alignment behaviors in terms of the rotational mobility of pendant coumarin monomers relative to the polarization axis of irradiation. The longer spacer in Polymer A imparts a higher mobility on coumarin monomers than that in Polymer B. The more rigid and bulky backbone in Polymer C than Polymers A and B could also restrict mobility of pendant coumarin monomers. The more mobile coumarin monomers are more reactive towards polarized irradiation thanks to reaction-induced molecular rotation, thus requiring less fluence to dimerize to the same extent with better oriented coumarin dimers along the polarization axis of UV-irradiation. These results suggest the important roles played by rotational mobility of pendant coumarin monomers, as affected by the polymer backbone rigidity and the flexible spacer length, in the outcome of photo-alignment of cholesteric GLCs of the present invention.

EXAMPLE 2

Synthesis and Characterization of Specific Compounds of the Present Invention

Materials and Methods
Material Synthesis.

All chemicals, reagents, and solvents were used as received from commercial sources without further purification except tetrahydrofuran (THF) that had been distilled over sodium and benzophenone. The 1-[(tert-butyldimethylsily)oxy]-3,5-benzenedicarboxylic acid was synthesized according to literature references. Compounds IX through XI and their intermediates were synthesized according to Reaction Scheme 3. (S)-2-(3-Hydroxy-2-methylpropoxy)-6-bromonaphthalene, 4. Acetonitrile (60 mL) was added to a mixture of 6-bromo-2-naphthol (2.7 g, 12 mmol), (S)-(+)-3-bromo-2-methylpropanol (2.0 g, 13 mmol), potassium carbonate (2.5 g, 18 mmol), and a catalytic amount of potassium iodide. After refluxing overnight, the solid residue was removed from the reaction mixture by filtration, and the filtrate was evaporated to dryness under reduced pressure. The solid residue was purified by gradient column chromatography on silica gel with hexane:methylene chloride (1:10) to pure methylene chloride to yield 4 (1.5 g, 43%). $^1$H NMR spectral data (400 MHz, CDCl$_3$): δ (ppm) 1.08 (d, 3H, —CH$_3$), 1.76 (s, 1H, HO—), 2.26 (m, 1H, —CH$_2$CH(CH$_3$)CH$_2$—), 3.74 (d, 2H, HOCH$_2$—), 4.05 (d, 2H, —CH$_2$OAr), 7.11-7.17 (m, 2H, aromatics), 7.47 (d, 1H, aromatics), 7.58 (d, 1H, aromatics), 7.64 (d, 1H, aromatics), 7.90 (s, 1H, aromatics).

(S)-2-(3-Hydroxy-2-methylpropoxy)-6-(4-cyanophenyl) naphthalene, Ch$_3$-OH. In a mixture of 4 (1.5 g, 5.1 mmol), 4-cyanophenyl boronic acid (0.82 g, 5.6 mmol), and tetrakis (triphenylphosphine)palladium(0) (0.29 g, 0.25 mmol), toluene (20 mL) and 2M Na$_2$CO$_3$ solution (15 ml, 30.5 mmol) were added. The reaction mixture was stirred under argon at 90° C. overnight. Upon cooling to room temperature, ethyl acetate was added to the reaction mixture. The organic layer was separated and washed with brine before dry over anhydrous magnesium sulfate. Upon evaporating off the solvent, the solid residue was purified by gradient column chromatography on silica gel with hexane:methylene chloride (1:10) to pure methylene chloride to yield Ch$_3$-OH (0.95 g, 59%). $^1$H NMR spectral data (400 MHz, CDCl$_3$): δ (ppm) 1.10 (d, 3H, —CH$_3$), 1.76 (t, 1H, HO—), 2.28 (m, 1H, —CH$_2$CH(CH$_3$)

Figure 6:
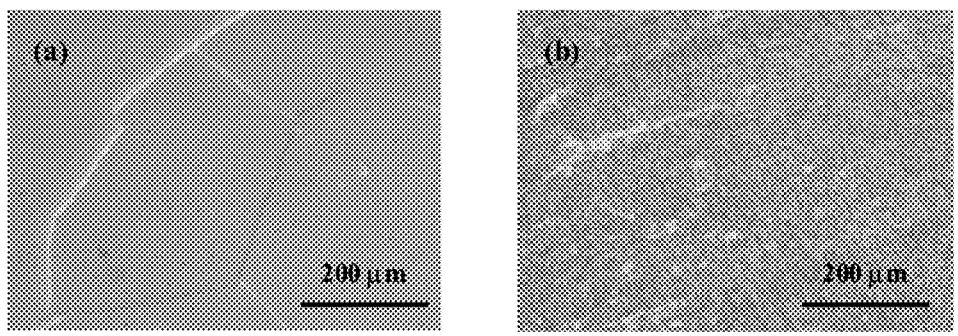
FIG. 6. Polarizing optical micrographs of 7-μm-thick cholesteric GLC films of III sandwiched between (a) Polymer A films irradiated with 0.2 J/cm$^2$ at 120° C. to X=0.24; and (d) Polymer C films irradiated with 0.5 J/cm$^2$ at 196° C. to X=0.27.

The polarizing optical micrographs presented in FIG. 6a indicate that the cholesteric GLC film of III between irradiated Polymer A films consists of large Grandjean domains. In contrast, the cholesteric GLC film of III between irradiated Polymer C films comprises a large number of very small domains, as shown in FIG. 6b. Since these small domains have a distributed surface normal, a limited fraction of the diffuse reflection of incident un-polarized light is detected at 6 degrees off normal, see FIG. 5d versus b. In contrast, the transmittance of the polydomain film is comparable to that of the nearly monodomain film because the transmitted light is right-handed which does not interact with the left-handed Grandjean domain regardless of its size and orientation. Nevertheless, the small domains in III between Polymer C films CH$_2$—), 3.76 (d, 2H, HOCH$_2$—), 4.10 (d, 2H, —CH$_2$OAr), 7.21 (d, 2H, aromatics), 7.67 (d, 1H, aromatics), 7.73-7.83 (m, 6H, aromatics), 7.98 (s, 1H, aromatics).

1-Hydroxy-3,5-benzenedicarboxylic acid, bis[(R)-3-[4-[(4'-cyanobiphenyl-4-yl)oxy carbonyl]phenoxy]-2-methylpropyl]ester, 5. To a solution of 1-[(tent-Butyldimethyl sily) oxy]-3,5-benzenedicarboxylic acid (0.36 g, 1.2 mmol), Ch$_2$-OH (1.00 g, 2.6 mmol), and TPP (0.71 g, 2.7 mmol) in anhydrous tetrahydrofuran (15 mL), DEADC (0.47 g, 2.7 mmol) was added dropwise. The reaction was stirred under argon at room temperature overnight. The solvent was then removed under reduced pressure, and the solid residue was purified by gradient column chromatography on silica gel with methylene chloride:hexane 100:10 to 100:5. The tert-butyldimethylsily ether was hydrolyzed with Cs$_2$CO$_3$ (0.19 g, 0.59 mmol) in the mixture of N,N-dimethylformamide (15 mL) and water (1.5 mL). After stirring at room temperature for 1 h, the reaction mixture was extracted with ethyl acetate. The extracted solution was washed with brine and dry over anhydrous magnesium sulfate. Upon evaporating off the solvent, the solid residue was purified by gradient column chromatography with acetone in methylene chloride from 0 to 3% to yield 5 (0.95 g, 87%). $^1$H NMR spectral data (400 MHz, CDCl$_3$): δ (ppm) 1.21 (d, 6H, —CH$_3$), 2.53 (m, 2H, —CH$_2$CH(CH$_3$)CH$_2$—), 4.06 (d, 4H, —CH$_2$OAr), 4.43 (m, 4H, —COOCH$_2$—), 5.50 (s, 1H, HO—), 6.99 (d, 4H, aromatics), 7.29 (d, 4H, aromatics), 7.63 (d, 4H, aromatics), 7.65-7.74 (m, 10H, aromatics), 8.14 (d, 4H, aromatics), 8.25 (s, 1H, aromatics)

1-Hydroxy-3,5-benzenedicarboxylic acid, bis[(R)-3-[[[6-(4-cyanophenyl)naphthyl]-2-yl]oxy]-2-methylpropyl]ester, 6. The procedure for the synthesis of 5 was followed to prepare 6 using Ch$_3$-OH (0.51 g, 1.6 mmol) instead of Ch$_2$-OH in 65% yield (0.51 g). $^1$H NMR spectral data (400 MHz, CDCl$_3$): δ (ppm) 1.18 (d, 6H, —CH$_3$), 2.52 (m, 2H, —CH$_2$CH(CH$_3$)CH$_2$—), 4.06 (m, 4H, —CH$_2$OAr), 4.43 (m, 4H, —COOCH$_2$—), 6.22 (s, 1H, HO—), 7.16 (t, 4H, aromatics), 7.63 (d, 2H, aromatics), 7.69-7.79 (m, 14H, aromatics), 7.94 (s, 2H, aromatics), 8.25 (s, 1H, aromatics).

1,3,5-Benzenetricarboxylic acid, tris[(R)-3-[[[6-(4-cyanophenyl)naphthyl]-2-yl]oxy]-2-methylpropyl]ester, IX. The procedure for the synthesis of II was followed to prepare IX using Ch$_3$-OH (0.41 g, 1.1 mmol) instead of Ch$_2$-OH in 73% yield (0.33 g). $^1$H NMR spectral data (400 MHz, CDCl$_3$): δ (ppm) 1.17 (d, 9H, —CH$_3$), 2.52 (m, 3H, —CH$_2$CH(CH$_3$)CH$_2$—), 4.05 (d, 6H, —CH$_2$OAr), 4.45 (m, 6H, —COOCH$_2$—), 7.15 (t, 6H, aromatics), 7.64 (d, 3H, aromatics), 7.69-7.78 (m, 18H, aromatics), 7.94 (s, 3H, aromatics), 8.85 (s, 3H, aromatics).

1,3,5-Benzenetricarboxylic acid, tris[3,5-benzenedicarboxylic acid, bis[(R)-3-[4-[(4'-cyanobiphenyl-4-yl)oxycarbonyl]phenoxy]-2-methylpropyl]ester]phenyl ester, X. 1,3,5-Benzenetricarboxylic acid (0.063 g, 0.30 mmol), 5 (0.89 g, 0.97 mmol), and DPTS (0.27 g, 0.91 mmol) were dissolved in a mixture of anhydrous methylene chloride (5 mL) and anhydrous N,N-dimethylformamide (2 mL). DCC was quickly added to the reaction mixture, which was stirred under argon at room temperature overnight. Upon filtering off white solids, the filtrate was diluted with additional methylene chloride. The solution was washed with 1M hydrochloric acid and brine before being dried over magnesium sulfate. The crude product was collected by evaporation under reduced pressure and purified by gradient column chromatography on silica gel with 0 to 0.5% methanol in chloroform to yield X (0.10 g, 11%). $^1$H NMR spectral data (400 MHz, CDCl$_3$): δ (ppm) 1.19 (d, 18H, —CH$_3$), 2.53 (m, 6H, —CH$_2$CH(CH$_3$)CH$_2$—), 4.04 (d, 12H, —CH$_2$OAr), 4.47 (m, 12H, —COOCH$_2$—), 6.98 (d, 12H, aromatics), 7.28 (d, 12H, aromatics), 7.60 (d, 12H, aromatics), 7.66 (d, 12H, aromatics), 7.70 (d, 12H, aromatics), 8.13 (d, 18H, aromatics), 8.62 (s, 3H, aromatics), 9.26 (s, 3H, aromatics).

1,3,5-Benzenetricarboxylic acid, tris[3,5-benzenedicarboxylic acid, bis[(R)-3-[[[6-(4-cyanophenyl)naphthyl]-2-yl]oxy]-2-methylpropyl]ester]phenyl ester, XI. The procedure for the synthesis of X was followed to prepare XI using 6 (0.47 g, 0.60 mmol) instead of 5 in 11% yield (0.048 g). $^1$H NMR spectral data (400 MHz, CDCl$_3$): δ (ppm) 1.20 (d, 18H, —CH$_3$), 2.53 (m, 6H, —CH$_2$CH(CH$_3$)CH$_2$—), 4.05 (d, 12H, —CH$_2$OAr), 4.46 (m, 12H, —COOCH$_2$—), 7.15 (t, 12H, aromatics), 7.61 (d, 6H, aromatics), 7.67-7.79 (m, 36H, aromatics), 7.91 (s, 6H, aromatics), 8.81 (s, 6H, aromatics), 8.64 (s, 3H, aromatics), 9.18 (s, 3H, aromatics).

Chart 3. Molecular Structures of IX-XI.

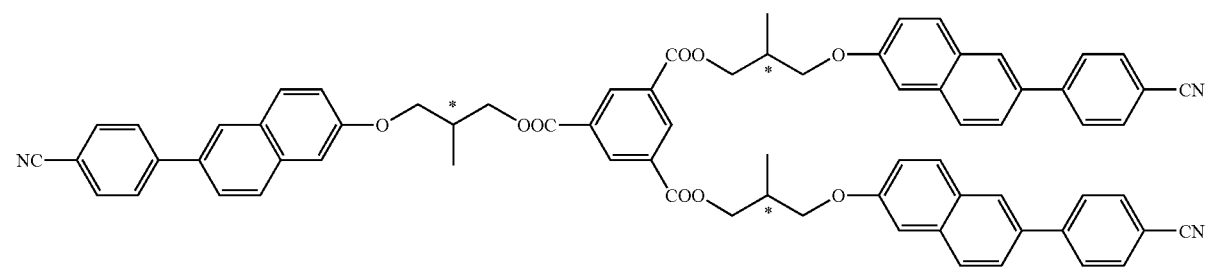

IX: G 85 Ch 161 I

Figure 1B:
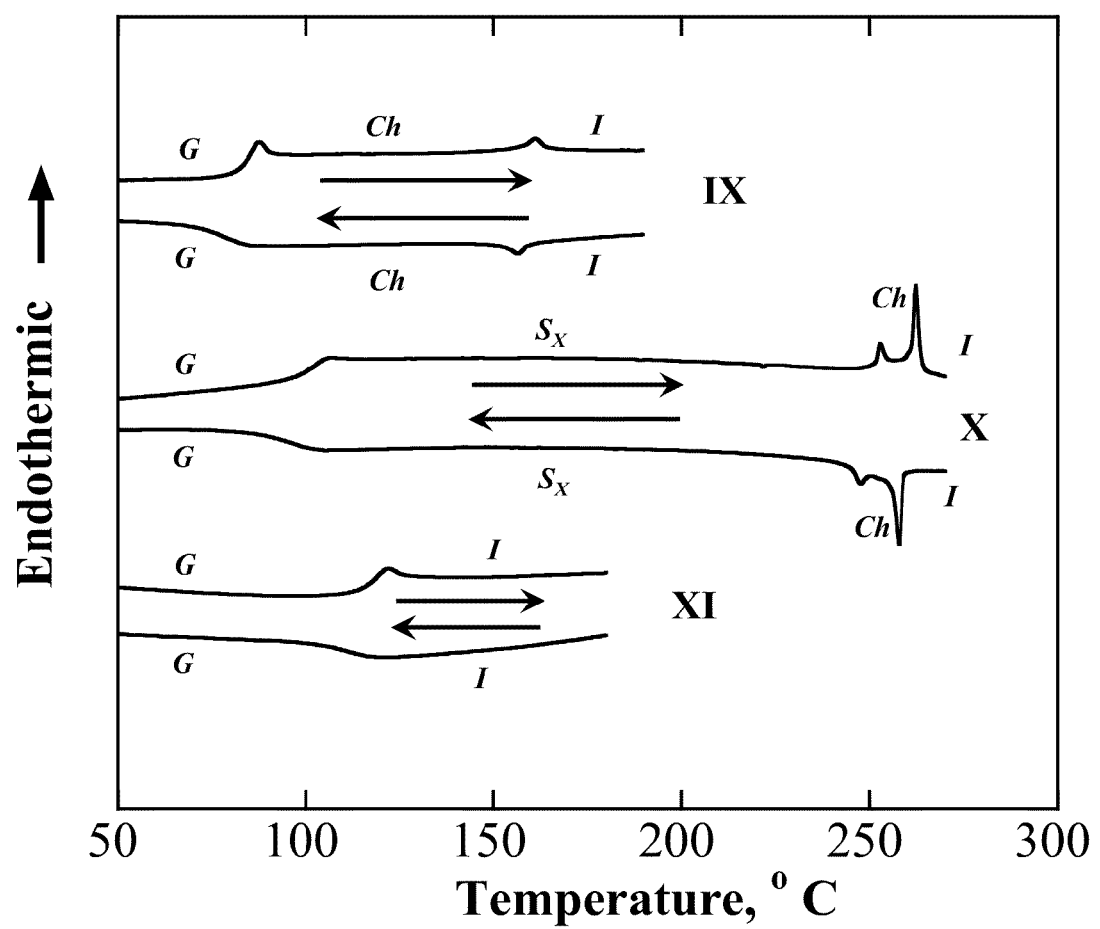

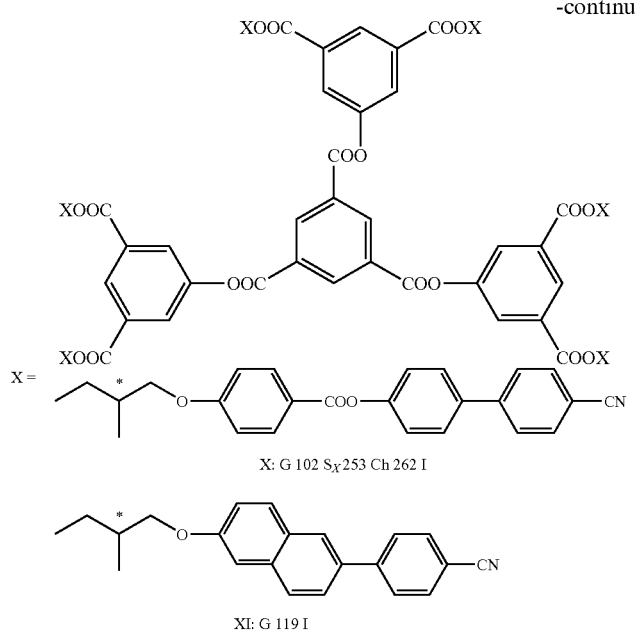
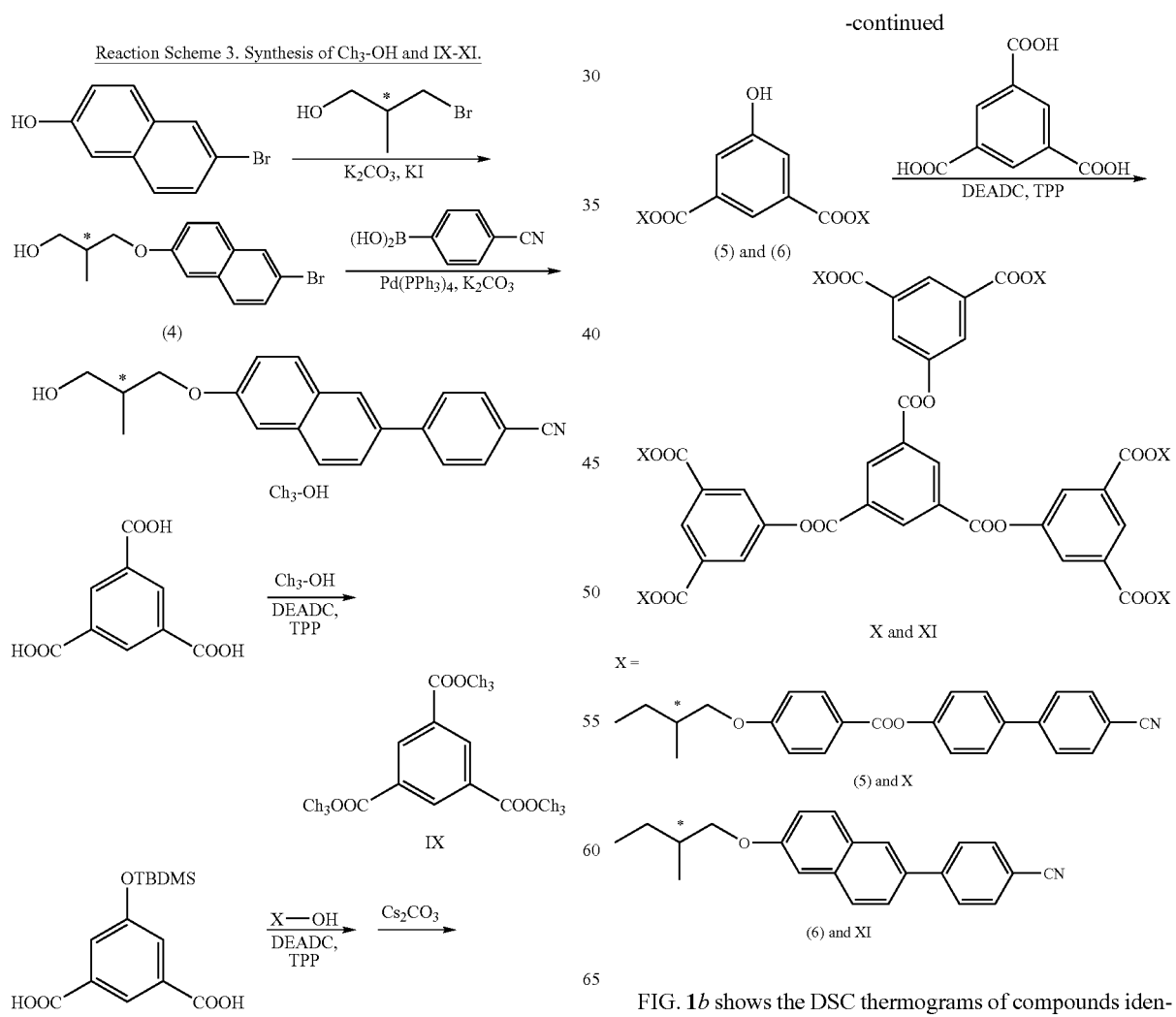
FIG. 1b shows the DSC thermograms of compounds identified in Example 2. Compound IX is a morphologically stable cholesteric GLC, with $T_g$ at 85° C. and $T_c$ at 161° C. Because of nonlinearity caused by naphthalene in the nematic moiety, the $T_c$ is lower for IX than II. Compounds with an extended core, X and XI, were prepared with $Ch_2$-OH and $Ch_3$-OH, respectively. Normally, $T_g$ increases with an increasing number of pendant groups.

While the invention has been described through illustrative examples and embodiments, routine modifications to the described examples and embodiments will be apparent to those skilled in the art and such modifications are intended to be within the scope of the present invention.

The invention claimed is:

1. A cholesteric glassy liquid crystal composition comprising a compound comprising:
   a) a core (A) comprising a single ring structure or multi-ring structure,
      wherein each ring of the single-ring or multi-ring structure independently has 4 to 8 carbons and independently is saturated, unsaturated, or aromatic;
   b) optionally, 1-10 expander moieties (E) having the following structure:

—(L-ER)— wherein L is a functional group independently selected in each E moiety from the group consisting of ether, ester, amide, thioether, and thioester,
   c) wherein ER is a single ring structure or multi-ring structure, and each ring of the single-ring or multi-ring structure independently has 4 to 8 carbons and independently is saturated, unsaturated, or aromatic; and
      wherein each expander moiety is connected to A via the L group in E; and
   d) a pendant moiety (Ch) having the following structure:

—(L-chiral spacer moiety-L-nematic moiety)

wherein L is independently selected for each occurrence in each Ch group;
      wherein the chiral spacer moiety comprises from 2 to 15 carbons and at least 1 chiral center;
      wherein the nematic moiety comprises from 2 to 15 aromatic rings,
      wherein the number of Ch moieties is from 1 to 20, and
      wherein each Ch is connected to A directly or via the ER group in E.

2. The composition of claim 1, wherein A is selected from the group consisting of a phenyl ring, cyclohexyl ring, bicyclic[2.2.2]oct-2-ene multi-ring structure, adamantane multi-ring structure, and cubane multi-ring structure.

3. The composition of claim 1, wherein the ER is selected from the group consisting of phenyl, cyclohexyl, pyridine, naphthalene.

4. The composition of claim 1, wherein the chiral spacer moiety has the following structure:

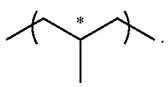

5. The composition of claim 1, wherein the nematic moiety is selected from the group consisting of the following:

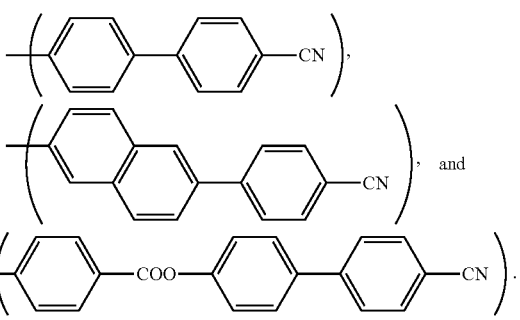

6. The composition of claim 1, wherein the compound is selected from the following compounds:

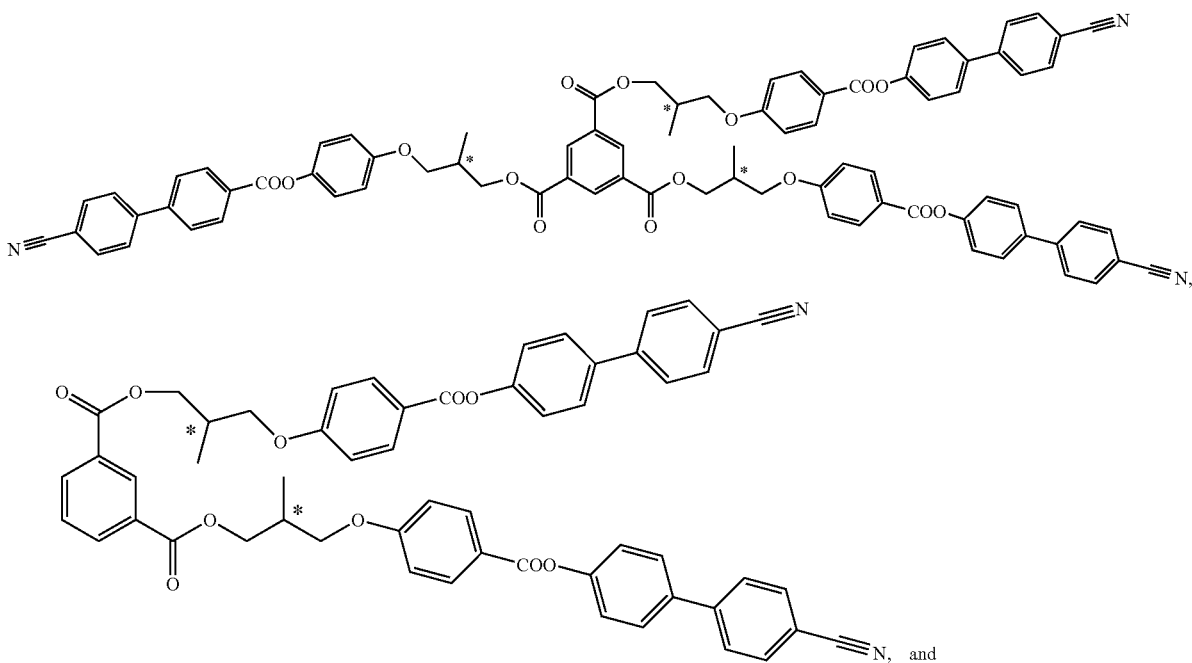

-continued

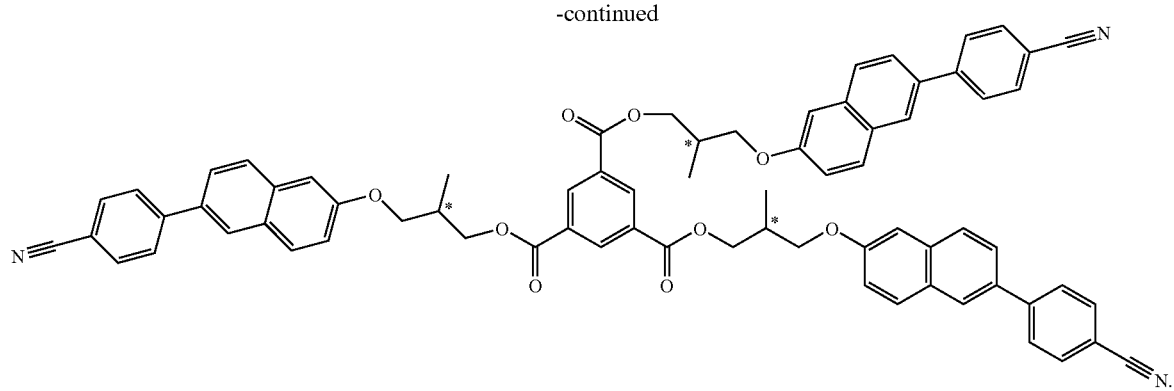

7. The composition of claim 1, wherein the compound is one of the following compounds:

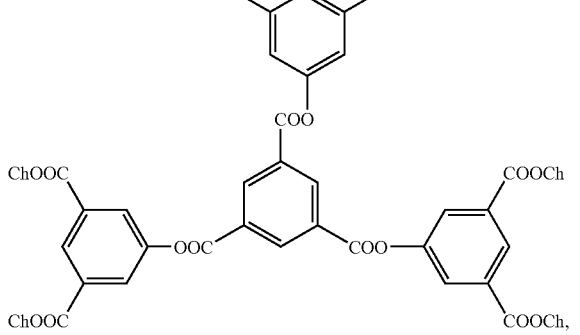

wherein

Ch =

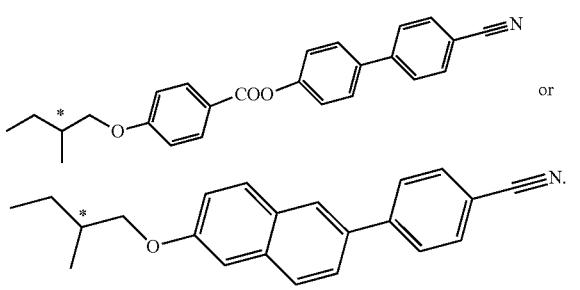

8. The composition of claim 1, wherein the number of expander moieties is selected from the group consisting of 1, 2, 3, and 4.

9. The composition of claim 1, wherein the chiral spacer moiety comprises a number of carbons selected from the group consisting of 3, 4, 5, 6, 7, 8, 9, and 10.

10. The composition of claim 1, wherein the number of Ch moieties is selected from the group consisting of 1, 2, 3, and 6.

11. The composition of claim 1, wherein
if A is a phenyl ring or cyclohexyl ring, then the number of Ch moieties is 1, 2 or 3, if A has the following structures:

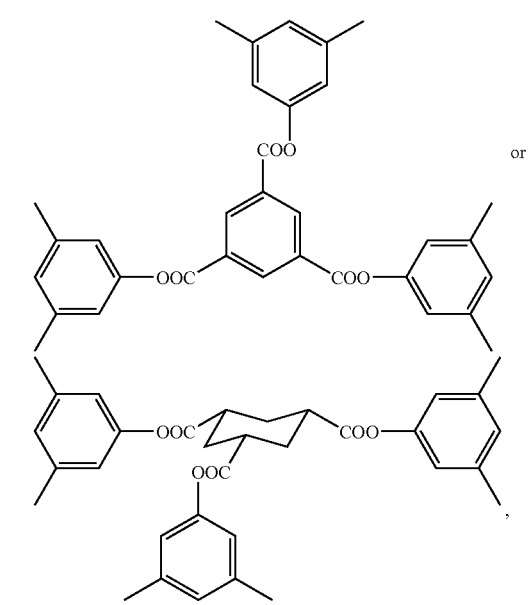

then the number of Ch moieties is any integer from 1 to 6.

12. The composition of claim 1, wherein:
if A is a bicyclic[2.2.2]oct-2-ene multi-ring structure, adamantane multi-ring structure, and cubane multi-ring structure, then the number of Ch moieties is 1, 2, 3 or 4,
if A has the following structure:

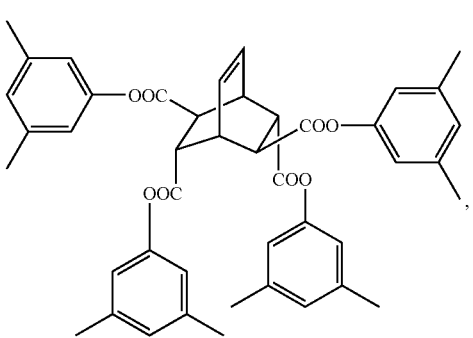

then the number of Ch groups is any integer from 1 to 8, if A has the following structures:

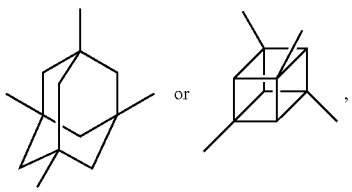

then the number of Ch moieties is any integer from 1 to 4.

13. The composition of claim 1, wherein the composition is present as a thin film.

14. The composition of claim 13, wherein the thin-film is oriented.

15. The composition of claim 14, wherein the oriented thin film is present as one layer of a multilayer composition of one or more thin-films, such that the molecular axes of the composition are uniaxially aligned.

16. A method for preparing oriented thin films of cholesteric glassy thin films comprising the steps of:
   a) depositing a first thin film of an alignment polymer on a substrate, wherein on irradiation with linearly polarized ultraviolet light the polymer is molecularly oriented in the direction of the polarization;
   b) irradiating the first thin film with linearly polarized ultraviolet radiation, such that the polymer of the first thin film is molecularly oriented in the direction of the polarization;
   c) depositing a second thin film of the composition of claim 1 on the first thin film;
   d) providing, optionally, a third thin film of an alignment polymer prepared on a substrate as in steps a) and b); and
   e) placing, optionally, the third thin film coated substrate from step d) on the second thin film from step c), such that the third thin film is opposed to the second thin film and the first and third films have the same direction of molecular orientation;
   f) annealing the substrate from step c) or step e) to a temperature above the glass transition temperature of composition,
   wherein the molecular axes of the compound are uniaxially oriented.

17. The method of claim 16, where the alignment polymer is a maleimide-norbornene copolymer comprising pendant coumarin monomers.

18. An optical device comprising a surface coated with at least one cholesteric glassy liquid crystal composition comprising a compound having the general structural formula of claim 1, such that light reflected or transmitted the cholesteric glassy liquid crystal composition is circularly polarized.

* * * * *